(12) United States Patent
Sert et al.

(10) Patent No.: US 10,984,659 B2
(45) Date of Patent: Apr. 20, 2021

(54) VEHICLE PARKING AVAILABILITY MAP SYSTEMS AND METHODS

(71) Applicant: Volvo Car Corporation, Gothenburg (SE)

(72) Inventors: Korkut Sert, Mountain View, CA (US); Sihao Ding, Mountain View, CA (US)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 16/508,340

(22) Filed: Jul. 11, 2019

(65) Prior Publication Data

US 2020/0090516 A1 Mar. 19, 2020

Related U.S. Application Data

(63) Continuation-in-part of application No. 16/129,871, filed on Sep. 13, 2018, now Pat. No. 10,720,058.
(Continued)

(51) Int. Cl.
*G08G 1/14* (2006.01)
*G06K 9/00* (2006.01)
*G08G 1/0969* (2006.01)

(52) U.S. Cl.
CPC ......... *G08G 1/141* (2013.01); *G06K 9/00812* (2013.01); *G08G 1/0969* (2013.01)

(58) Field of Classification Search
CPC ........... G06K 9/00812; G06K 9/00771; G06K 9/4604; G06K 9/6202; G06K 9/6212; G05D 1/021; G05D 1/0212; G05D 1/0246; G05D 1/0808; G05D 2201/0213; G06Q 20/10; G06Q 10/02; G06Q 10/08; G06Q 20/127; G06Q 20/3224; G06Q 2240/00; G06Q 30/02; G06Q 30/06; G06Q 50/30; G06T 11/60; G07B 15/02; G08G 1/0137; G08G 1/123; G08G 1/144; G08G 1/146;
(Continued)

(56) References Cited

U.S. PATENT DOCUMENTS 9,260,090 B2 2/2016 Toledo et al.
9,449,512 B2 9/2016 Zafiroglu et al.
(Continued)

OTHER PUBLICATIONS

Nov. 24, 2020 European Search Report Issued on International Application No. 20185173.

*Primary Examiner* — Daniel Previl
(74) *Attorney, Agent, or Firm* — Clements Bernard Walker; Christopher L. Bernard

(57) ABSTRACT

A parking availability map system and method, including: a sensor-based parking space detection system coupled to a vehicle and operable for detecting and identifying open and occupied parking spaces within a predetermined vicinity of the vehicle; and an application server disposed remotely from the vehicle and executing an algorithm operable for receiving open and occupied parking space data from the sensor-based parking space detection system, receiving a parking space availability query from a user disposed remotely from the server, and, responsive to the parking space availability query, transmitting parking space availability information to the user. Optionally, the sensor-based parking space detection system includes a camera-based parking space detection system.

20 Claims, 23 Drawing Sheets

Related U.S. Application Data

(60) Provisional application No. 62/730,856, filed on Sep. 13, 2018.

(58) Field of Classification Search
CPC ...... B60W 30/06; G01S 13/867; G01S 19/13; G01S 19/48; G01S 2013/9314; G01S 2013/9323; G01S 2013/9324; G07F 17/246
USPC .. 340/932.2, 435–436, 903, 937, 691.6, 7.3, 340/7.24, 825.49, 426.22, 438, 439
See application file for complete search history.

(56) References Cited

U.S. PATENT DOCUMENTS

| | | | |
|---|---|---|---|
| 9,696,420 B2 * | 7/2017 | Shaffer | G01S 13/862 |
| 9,944,282 B1 | 4/2018 | Fields et al. | |
| 10,025,317 B2 | 7/2018 | Batur et al. | |
| 10,311,731 B1 | 6/2019 | Li et al. | |
| 2011/0080304 A1 * | 4/2011 | Toledo | G08G 1/165 340/932.2 |
| 2015/0279210 A1 | 10/2015 | Zafiroglu et al. | |
| 2016/0231133 A1 | 8/2016 | Johnson et al. | |
| 2017/0267233 A1 * | 9/2017 | Minster | B62D 15/02 |
| 2017/0329346 A1 | 11/2017 | Latotzki | |
| 2018/0056872 A1 | 3/2018 | Taylor et al. | |
| 2018/0095474 A1 * | 4/2018 | Batur | G01S 19/48 |
| 2018/0201256 A1 * | 7/2018 | Tseng | B60W 30/06 |
| 2018/0232958 A1 * | 8/2018 | Wang | G07B 15/02 |
| 2019/0019407 A1 * | 1/2019 | Nakhjavani | G06K 9/00812 |
| 2019/0122553 A1 | 4/2019 | Sakuma et al. | |

* cited by examiner

| Stage | Filters | Size | Repetition |
|---|---|---|---|
| Feature Extraction | | | |
| Conv1 | 64 | 7 X 7 (stride 2) | X 1 |
| MaxPool | | 3 X 3 (stride 2) | X 1 |
| Conv2 | 64<br>64<br>256 | 1 X 1 (stride 2 in first repetition)<br>3 X 3<br>1 X 1 | X 3 |
| Conv3 | 128<br>128<br>512 | 1 X 1 (stride 2 in first repetition)<br>3 X 3<br>1 X 1 | X 4 |
| Conv4 | 256<br>256<br>1024 | 1 X 1 (stride 2 in first repetition)<br>3 X 3<br>1 X 1 | X 6 |
| Conv5 | 512<br>512<br>2048 | 1 X 1 (stride 2 in first repetition)<br>3 X 3<br>1 X 1 | X 3 |
| Feature Pyramid | | | |
| P5 | 128 | 1 X 1 | X 1 |
| P6 | 128 | 3 X 3 (stride 2) | X 1 |
| P4, P3, P2 | 128<br>128 | 1 X 1<br>3 X 3 | X 3 |
| Output Heads (concatenate on each of P2-P6) | | | |
| Classify | 128<br>128<br>128<br>k .a | 3 X 3<br>3 X 3<br>3 X 3<br>3 X 3 | X 1 |
| Regress | 128<br>128<br>128<br>d .a | 3 X 3<br>3 X 3<br>3 X 3<br>3 X 3 | X 1 |

Fig. 6

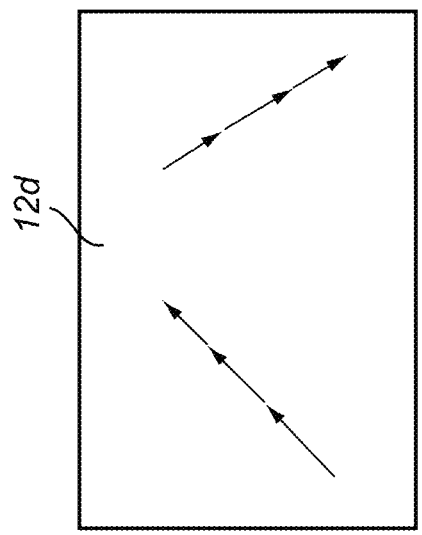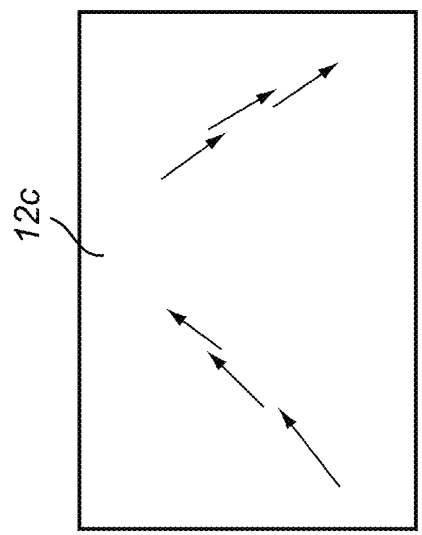
Fig. 7

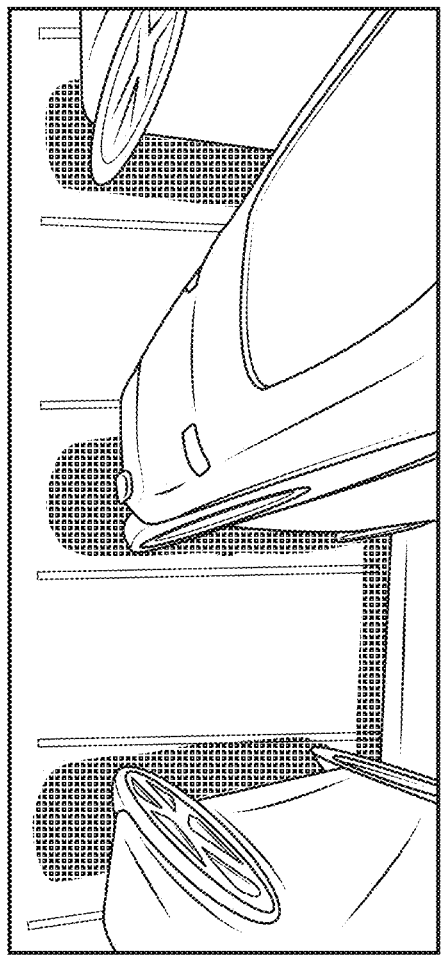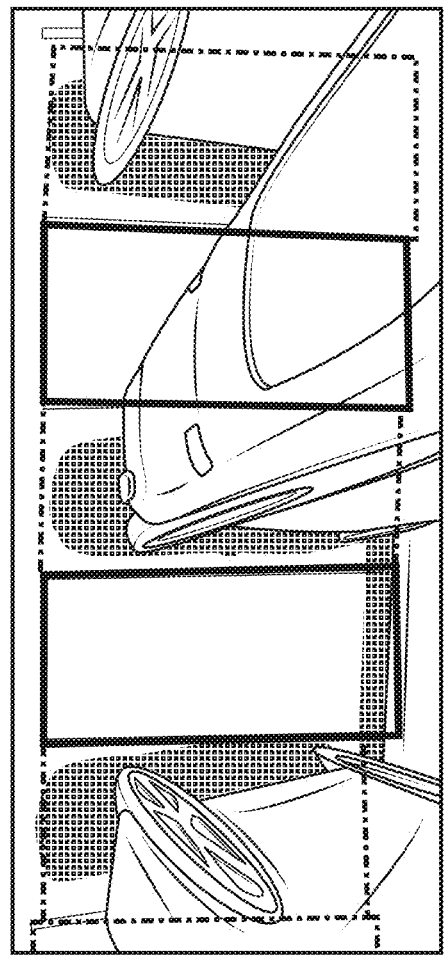
Fig. 21

VEHICLE PARKING AVAILABILITY MAP SYSTEMS AND METHODS

CROSS-REFERENCE TO RELATED APPLICATIONS

The present disclosure is a continuation-in-part (CIP) of U.S. patent application Ser. No. 16/129,871, filed on Sep. 13, 2018, and entitled "SYSTEM AND METHOD FOR CAMERA OR SENSOR-BASED PARKING SPOT DETECTION AND IDENTIFICATION," and claims the benefit of priority of U.S. Provisional Patent Application No. 62/730,856, filed on Sep. 13, 2018, and entitled "METHODS AND SYSTEMS FOR PARKING LINE MARKER DETECTION AND PAIRING AND PARKING SPOT DETECTION AND CLASSIFICATION," the contents of both of which are incorporated in full by reference herein.

TECHNICAL FIELD

The present disclosure relates generally to the automotive field. More particularly, the present disclosure relates to vehicle parking availability map systems and methods that utilize real-time and historical vehicle camera data to identify and predict open parking spaces for a user via an in-vehicle display, a mobile application, a web-based application, or the like.

BACKGROUND

In the modern world, finding available parking is a persistent and growing problem, especially in large metropolitan areas, busy parking lots, etc. This problem is typically addressed by simply driving around in circles looking for an open parking space, which is both inconvenient and inefficient, wasting time and fuel or power. In order to address this problem, various mobile applications have been developed that display open parking spaces in a given area or lot to a user. These mobile applications typically utilize data collected from parking meter systems or static area or lot cameras, thus the mobile applications are geographically and situationally limited.

Some modern vehicles are now being developed that make extensive use of their on-board cameras for numerous purposes, including the detection and classification of open and occupied parking spaces. As most modern vehicles are now "networked" and include mobile communications links, such parking space information can now be uploaded to the cloud, aggregated, and leveraged, providing real-time and historical data that can be used by numerous users to find available parking in numerous areas or lots. Such functionality is the subject of the present disclosure.

SUMMARY

In various exemplary embodiments, the present disclosure provides vehicle parking availability map systems and methods that utilize real-time and historical vehicle camera data to identify, predict, and locate open parking spaces for a user via an in-vehicle display, a mobile application, a web-based application, or the like. The on-board camera(s) in a vehicle is/are used to detect and classify open and occupied parking spaces. This parking space information is then uploaded to the cloud, aggregated, and leveraged, providing real-time and historical data that can be used by numerous users to find available parking in numerous areas or lots.

The parking availability map (PAM) provided can display open parking spaces on a map of an area or lot, or a heat map of collections of such open parking spaces, as well as a percentage of open parking spaces or parking density for an area or lot. This information can be real-time, historical, or predicted given the location, date, and time. The display utilized can incorporate a bird's-eye-view (BEV) or a three-dimensional (3-D) perspective view, and can provide turn-by-turn driving directions (visual and/or audible) to an open parking space or collection of such open parking spaces. Further, particular open parking spaces of interest can be identified and located, such as handicap parking spaces, etc.

The concepts of the present disclosure are not limited to camera sensors, but may extend to other perception sensors as well, such as near-field sensors, LIDAR sensors, and the like. Thus, as used herein, "camera" is intended to contemplate such other sensor types as well, whether front-facing, side-facing, or rear-facing relative to the exterior of the vehicle.

In one exemplary embodiment, the present disclosure provides a parking availability map system, including: a sensor-based parking space detection system coupled to a vehicle and operable for detecting and identifying open and occupied parking spaces within a predetermined vicinity of the vehicle; and an application server disposed remotely from the vehicle and executing an algorithm operable for receiving open and occupied parking space data from the sensor-based parking space detection system, receiving a parking space availability query from a user disposed remotely from the server, and, responsive to the parking space availability query, transmitting parking space availability information to the user. Optionally, the sensor-based parking space detection system includes a camera-based parking space detection system. The detecting and identifying the open and occupied parking spaces includes, for each parking space, classifying a type of parking space. The receiving the open and occupied parking space data includes, for each parking space, receiving location information based on a location of the vehicle. The parking space availability information includes one or more of real-time parking space availability information, historical parking space availability information, and statistical parking space availability information. The parking space availability information includes one or more of a heat map indicating locations of open parking spaces, a bird's-eye-view map indicating locations of open parking spaces, a three-dimensional map indicating locations of open parking spaces, and turn-by-turn directions to a location of an open parking space. Receiving the parking space availability query from the user includes receiving the parking space availability query from one of an on-board vehicle application, a mobile application, a web-based application, and an autonomous driving system.

In another exemplary embodiment, the present disclosure provides a parking availability map method, including: using a sensor-based parking space detection system coupled to a vehicle, detecting and identifying open and occupied parking spaces within a predetermined vicinity of the vehicle; and, using an application server disposed remotely from the vehicle and executing an algorithm, receiving open and occupied parking space data from the sensor-based parking space detection system, receiving a parking space availability query from a user disposed remotely from the server, and, responsive to the parking space availability query, transmitting parking space availability information to the user. Optionally, the sensor-based parking space detection system includes a camera-based parking space detection system. The detecting and identifying the open and occupied parking spaces includes, for each parking space, classifying a type of parking space. The receiving the open and occupied parking space data includes, for each parking space, receiving location information based on a location of the vehicle. The parking space availability information includes one or more of real-time parking space availability information, historical parking space availability information, and statistical parking space availability information. The parking space availability information includes one or more of a heat map indicating locations of open parking spaces, a bird's-eye-view map indicating locations of open parking spaces, a three-dimensional map indicating locations of open parking spaces, and turn-by-turn directions to a location of an open parking space. Receiving the parking space availability query from the user includes receiving the parking space availability query from one of an on-board vehicle application, a mobile application, a web-based application, and an autonomous driving system.

In a further exemplary embodiment, the present disclosure provides a non-transitory computer-readable medium stored in a memory and executed by a processor to perform the steps including: receiving open and occupied parking space data from a sensor-based parking space detection system, wherein the sensor-based parking space detection system is coupled to a vehicle and operable for detecting and identifying open and occupied parking spaces within a predetermined vicinity of the vehicle; receiving a parking space availability query from a remote user; and, responsive to the parking space availability query, transmitting parking space availability information to the user. Optionally, the sensor-based parking space detection system includes a camera-based parking space detection system. The detecting and identifying the open and occupied parking spaces includes, for each parking space, classifying a type of parking space. The receiving the open and occupied parking space data includes, for each parking space, receiving location information based on a location of the vehicle. The parking space availability information includes one or more of real-time parking space availability information, historical parking space availability information, and statistical parking space availability information. The parking space availability information includes one or more of a heat map indicating locations of open parking spaces, a bird's-eye-view map indicating locations of open parking spaces, a three-dimensional map indicating locations of open parking spaces, and turn-by-turn directions to a location of an open parking space. Receiving the parking space availability query from the user includes receiving the parking space availability query from one of an on-board vehicle application, a mobile application, a web-based application, and an autonomous driving system.

BRIEF DESCRIPTION OF THE DRAWINGS

The present disclosure is illustrated and described herein with reference to the various drawings, in which like reference numbers are used to denote like system components/method steps, as appropriate, and in which:

FIG. 6 is a table illustrating one exemplary network structure of the DNN of the present disclosure;

FIG. 7 is a schematic diagram illustrating the operation of the enhanced DNN of the present disclosure;

FIG. 21 is a BEV image illustrating rectangles drawn to represent parking spaces, a given color or coding indicates that a specific parking space is not occupied, while another given color or coding indicates that a specific parking space is occupied;

DESCRIPTION OF EMBODIMENTS

In various exemplary embodiments, the present disclosure provides vehicle parking availability map systems and methods that utilize real-time and historical vehicle camera data to identify, predict, and locate open parking spaces for a user via an in-vehicle display, a mobile application, a web-based application, or the like. The on-board camera(s) in a vehicle is/are used to detect and classify open and occupied parking spaces. This parking space information is then uploaded to the cloud, aggregated, and leveraged, providing real-time and historical data that can be used by numerous users to find available parking in numerous areas or lots.

The PAM provided can display open parking spaces on a map of an area or lot, or a heat map of collections of such open parking spaces, as well as a percentage of open parking spaces or parking density for an area or lot. This information can be real-time, historical, or predicted given the location, date, and time. The display utilized can incorporate a BEV or a 3-D perspective view, and can provide turn-by-turn driving directions (visual and/or audible) to an open parking space or collection of such open parking spaces. Further, particular open parking spaces of interest can be identified and located, such as handicap parking spaces, motorcycle parking spaces, loading areas, etc.

Again, the concepts of the present disclosure are not limited to camera sensors, but may extend to other perception sensors as well, such as near-field sensors, LIDAR sensors, and the like. Thus, as used herein, "camera" is intended to contemplate such other sensor types as well, whether front-facing, side-facing, or rear-facing relative to the exterior of the vehicle.

Figure 1:
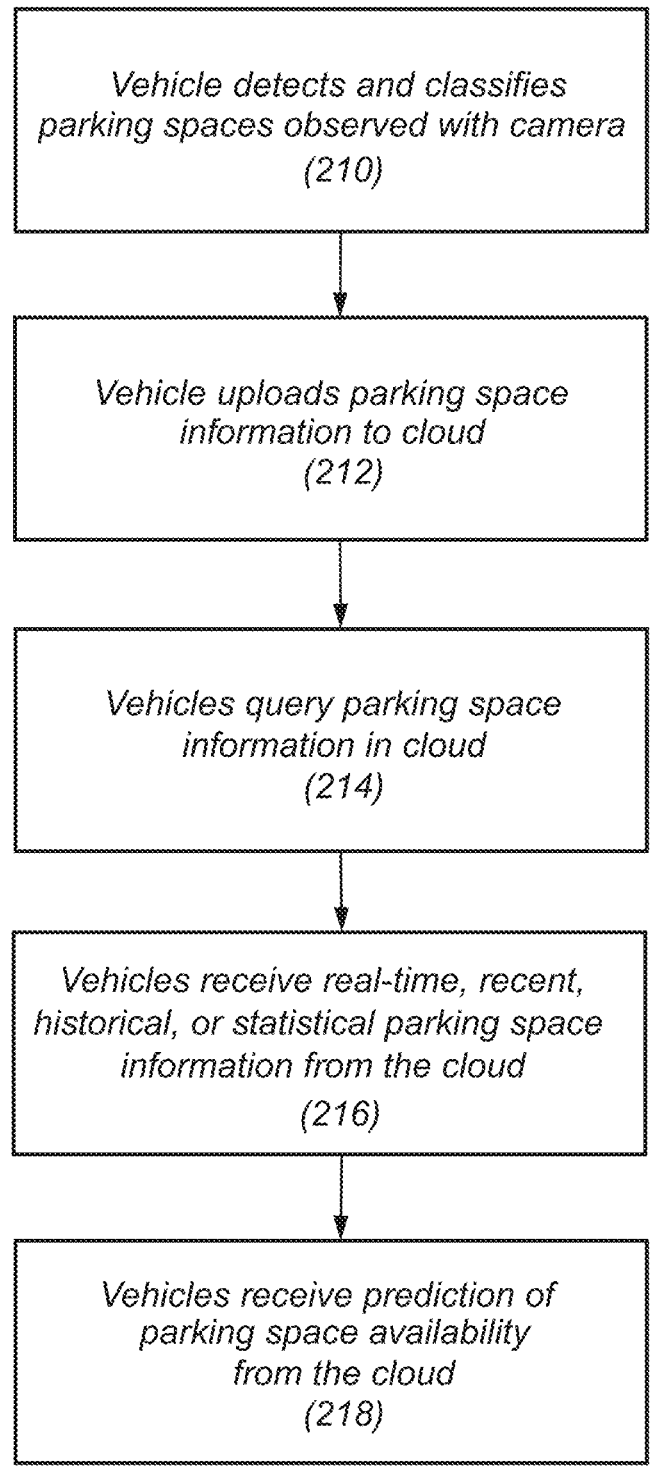
FIG. 1 is a flowchart illustrating the functional workflow associated with one exemplary embodiment of the PAM system and method of the present disclosure.

Referring now specifically to FIG. 1, in terms of system and method workflow, each individual vehicle first detects, identifies, and classifies open and occupied parking spaces using its on-board camera(s) and processor algorithm(s) 210, described in greater detail herein below. Subsequently, this parking space information is uploaded to the cloud 212. Parking availability may then be queried by other vehicles and users that need the parking space information to navigate other intended parking areas 214. If real-time or recent parking space information is not available in the cloud, the historical parking space information and statistics can be provided to the other vehicles and users 216. Predictions about parking space availability can also be generated from the historical parking space information 218, based on a given location, date, and time.

By way of one example, the on-board vehicle system and method for camera or sensor-based parking space detection and identification utilizes a front (or side or rear) camera or sensor image to detect and identify one or more parking spaces at a distance via vector representation using a deep neural network trained with data annotated using an annotation tool, without first transforming the camera or sensor image(s) to a BEV or the like. The system and method can form an integral part of a driver assist (DA) or autonomous driving (AD) system.

The vector representation is a compact representation that is encoded with the position, size, and orientation of a detected parking space or spaces, as well as entrance direction and type identification (vacant, occupied, handicap, emergency, loading zone, etc.). It will be apparent to those of ordinary skill in the art that such vector representation can be readily extended to spaces other than parking spaces.

Figure 2:
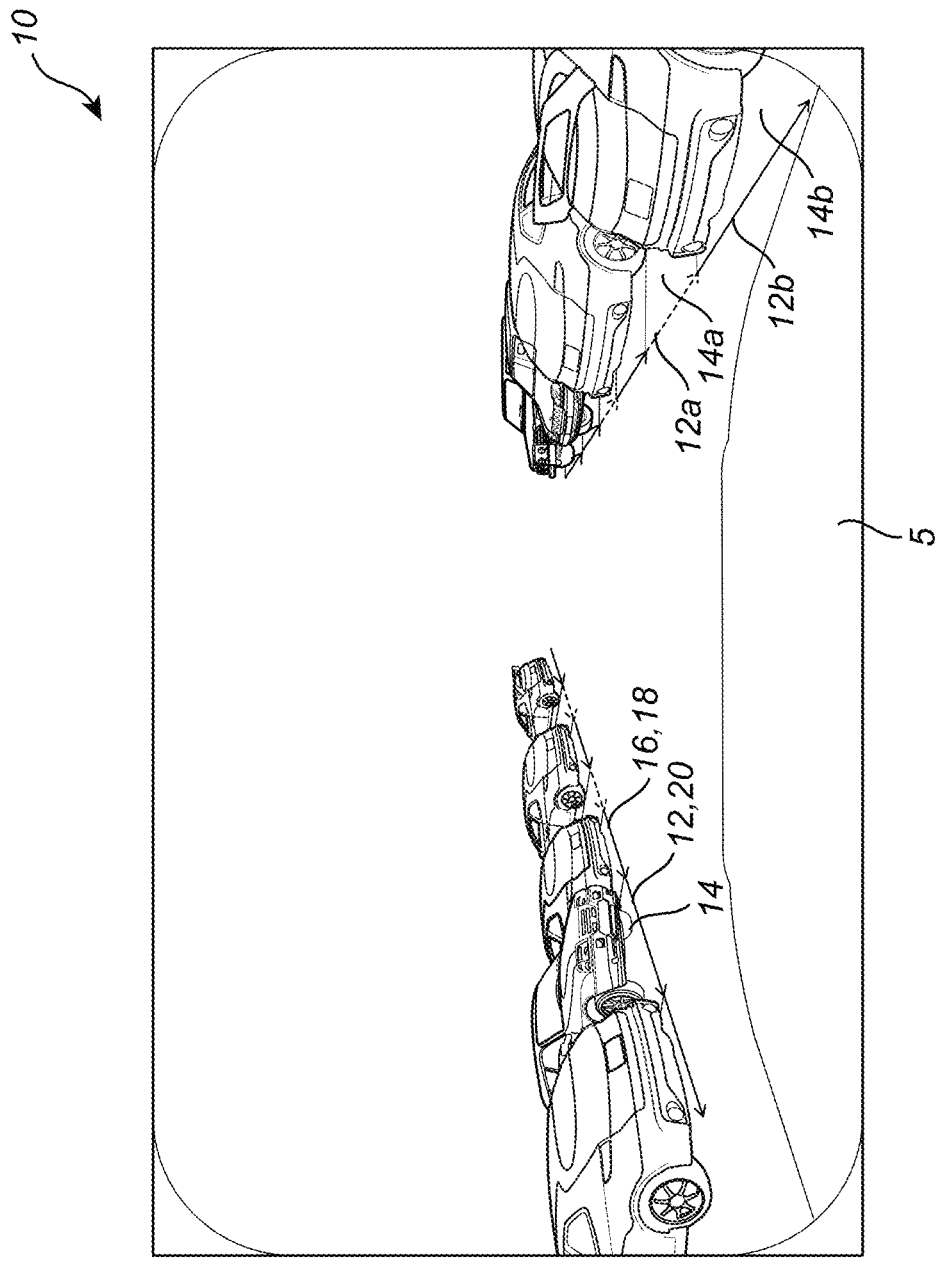
FIG. 2 is a front camera image illustrating the parking space vector representation of the present disclosure.
Figure 3:
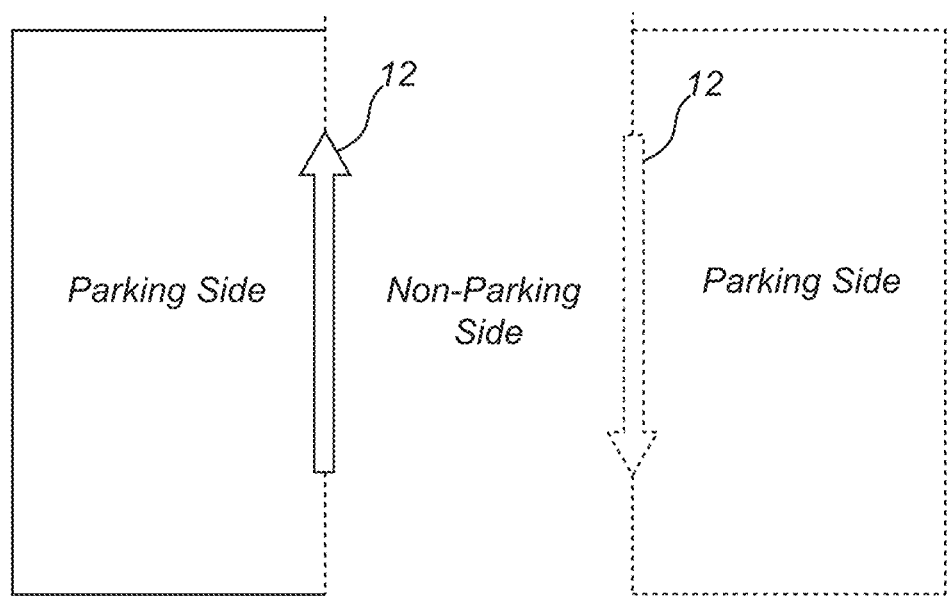
FIG. 3 is a schematic diagram illustrating the directionality of the parking space vector representation of the present disclosure.

Referring now specifically to FIG. 2, a standard front vehicle camera image 10 is shown, with overlaid vector representations 12 of each parking space 14 provided. In general, these vector representations 12 connect the points 16 associated with each front corner 18 of the corresponding parking space 14, highlighting the entrance 20 of each parking space 14. A first type of parking space 14a, such as an unoccupied parking space, a standard parking space, etc., may be indicated by a first color or texture vector representation 12a, while a second type of parking space 14b, such as an occupied parking space, a handicap/emergency parking space, etc., may be indicated by a second color or texture vector representation 12b. Thus, the vector representations 12 are encoded with classification information related to the parking spaces 14, in addition to position, size, and orientation information. In this exemplary embodiment, the directional arrow orientation of each vector representation 12 indicates which side of the vehicle 5 the entrance 20 of the corresponding parking space 14 is present on, with generally upward-oriented arrows indicating an entrance 20 on the left side of the vehicle 5 from the driver's perspective and generally downward-oriented arrows indicating an entrance 20 on the right side of the vehicle 5 from the driver's perspective. This is shown in FIG. 3.

Figure 4:
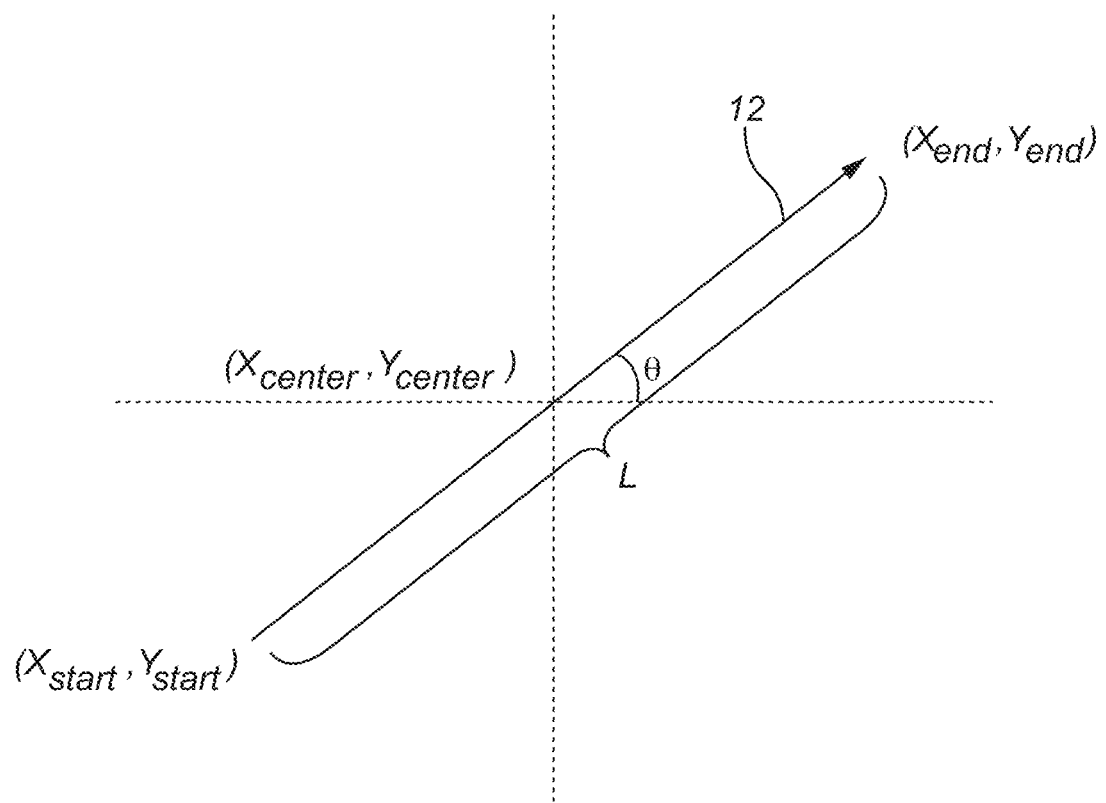
FIG. 4 is a schematic diagram illustrating one exemplary convention for orienting the parking space vector representation of the present disclosure.

As shown in FIG. 4, 90-degree counter-clockwise rotation of the vector 12 points to the associated parking space in the ground plane, for example, thereby providing a formally defined convention with vector classification encoding [0, 1, 0, . . . , 0] or vector regression encoding $[x_{start}, y_{start}, x_{end}, y_{end}]$, $[x_{center}, y_{center}, l, \theta]$, or $[x_{center}, y_{center}, l, \sin\theta, \cos\theta]$. It will be readily apparent to those of ordinary skill in the art that other representations may be used equally, provided that they are capable of communicating the same or similar information.

As alluded to above, most conventional on-board vehicle parking space detection systems (which the parking space detection and identification system of the present disclosure may complement) utilize one or more proximity sensors, e.g. ultra-sonic sensors, radar sensors, or the like, mounted on a vehicle to detect an empty parking space between two occupied parking spaces. Such detection is limited by the close range of operation of such sensors, typically on the order of a few meters. This is remedied by the parking space detection and identification system of the present disclosure, which can "see" a considerable distance in front of, next to, or behind the vehicle (on the order of tens of meters). Thus, more parking spaces can be "covered" per time unit, allowing for behavioral planning before a parking space has been passed, for example. Further, such conventional detection requires the presence of structures or obstacles, e.g. other vehicles, on either side of an empty parking space to be detected. If an empty parking "slot" is not created by physical references, then detection fails. This is again remedied by the parking space detection and identification system of the present disclosure, which is not constrained by the presence of structures or obstacles on either side of an empty parking space to be detected. The parking space detection and identification system detects and identifies the parking spaces themselves, in large part, from only a visible line or other marking. This enhances the usefulness of the parking space detection and identification system in DA and AD systems.

Similarly, conventional parking space detection systems that utilize BEV camera images generate the BEV from multiple, e.g. four, fisheye camera images that are warped to be parallel to the ground and stitched together to create a view of a vehicle from above, including the nearby surroundings. Lines and obstacles related to parking spaces are segmented from these BEV camera images. Such detection is limited in terms of range, typically to a few meters, and the BEV camera images are typically undesirably distorted. This also limits the usefulness of these BEV camera image-based parking space detection systems in DA and AD systems. The parking space detection and identification system of the present disclosure can advantageously "see" a considerable distance in front of, next to, or behind the vehicle (on the order of tens of meters). Further, the use of a front camera image takes full advantage of the presence of the vehicle headlights, in image acquisition at night, for example. This is not the case when using a BEV image.

Figure 5:
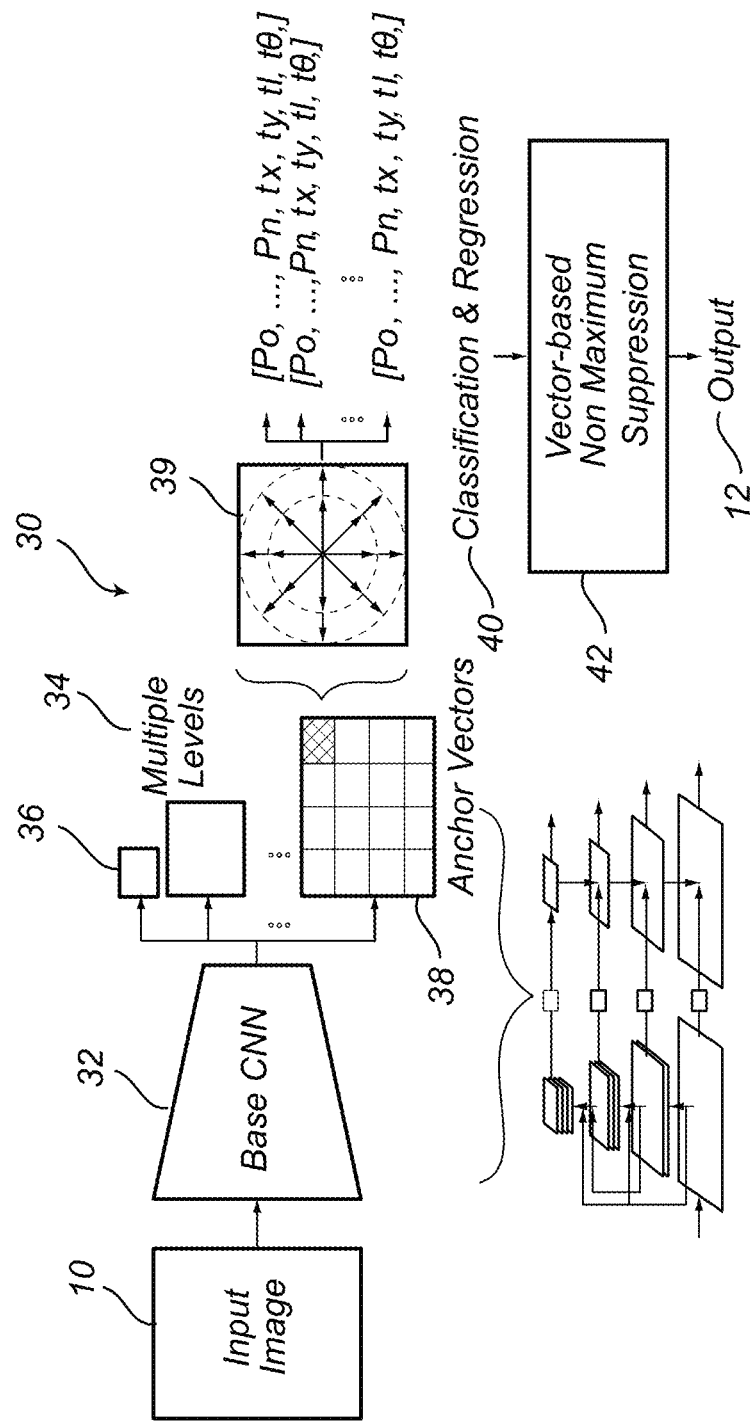
FIG. 5 is a schematic diagram illustrating one exemplary embodiment of the deep neural network (DNN) of the present disclosure.

Referring now specifically to FIG. 5, the network 30 of the present disclosure used to detect and identify parking spaces 14 (FIG. 2) from standard camera or sensor images 10 and generate vectors 12 can, broadly to narrowly, be classified as an artificial intelligence (AI) network, a machine learning (ML) network, a deep learning (DL) network, a DNN, a convolutional neural network (CNN), etc. The input to the network 30 is the camera or sensor image (or images) 10 from the vehicle camera or sensor (or cameras or sensors), and the output is encoded vector(s) 12 representing detected and identified parking space(s) 14. The input image 10 is provided to a base CNN 32 or the like that creatures feature pyramids 34 including multiple levels 36 and anchor vectors 38 [$p_0, \ldots, p_n, t_x, t_y, t_l, t_\theta$], as multiple vectors are implicated by a given parking space 14. Classification and regression techniques 40 are then utilized, and vector-based non-maximum suppression 42 is performed to achieve the final output vector representation 12 for the given parking space 14.

The whole pipeline can be divided into three stages: input pre-processing, network operations, and output post-processing.

The input pre-processing stage includes grabbing frame(s) from the camera(s) or sensor(s) and applying required input normalization to scale the pixel values to between about −0.5 and 0.5 and provide zero (0) mean and unit (1) variance. The purpose of this stage is to allow for easier training of the following network 30 and to improve robustness as compared to input noise.

The network operations stage takes the processed input image(s) 10 as input and outputs the predicted vectors 12 encoded with classification and regression information. The network structure can be further divided into three parts: feature extraction, the feature pyramids 34, and output heads. The feature extraction part is composed of the base CNN 32 that is responsible for extracting useful features from the input image(s) 10. The feature pyramids 34 cast the extracted features into multi-scale features to achieve scale robustness. The output heads contain a classification head and a regression head. The classification head outputs the class information of predicted vectors, and the regression head outputs the position, direction, and size of the predicted vectors. For each layer in the feature pyramids 34, such pair of output heads is attached, which means that the prediction of vectors takes place at different scales so that vectors of all sizes can be detected and identified. The anchor vectors 38 are predefined vectors with various orientations and lengths. When a vector is sufficiently similar to an anchor vector 38, the anchor vector 38 is activated and assigned a score based on similarity. During training of the network 30, the anchor vectors 38 are assigned positive (activated) or negative (deactivated) status based on their similarity score with ground truth vectors derived from annotation. The similarity between two vectors is determined by a combination of center position, length, and direction of the two vectors. When the similarity score is higher than a predefined value, the anchor vectors 38 are given the label positive. When the similarity score is lower than a predefined value, the anchor vectors 38 are given the label negative. Potentially, when the two values are set differently, the anchor vectors 38 with a similarity score in between will be set to be ignored during the calculation of the loss. The training process involves iteratively updating the value of the parameters of the network 30 so that the loss (a value characterizing the prediction error) is small between the predicted vectors and the ground-truth vectors derived from annotation. The outputs are encoded so that each vector is a transformed version of an activated anchor vector 38. The [$p_0, \ldots, p_n$] encodes which class the vector belongs to. The [$t_x, t_y, t_l, t_\theta$] encodes how the vector is transformed from the anchor vector 38 using the following formulas:

$$t_x = \frac{b_x - a_x}{a_l},$$

$$t_y = \frac{b_y - a_y}{a_l},$$

$$t_l = \log\left(\frac{b_l}{a_l}\right),$$

$$t_\theta = b_\theta - a_\theta,$$

where a and b represent the anchor vector 38 and the vector to be encoded, respectively; subscripts x, y, l, and θ represent the horizontal and vertical coordinates of the center of the vector, the length of the vector, and the direction of the vector, respectively.

The output post-processing stage includes a decoding step that interprets the output of the network operations stage and a vector-based non-maximum suppression (NMS) step. The vector-based NMS step is specifically designed to operate on vectors, as opposed to bounding boxes for standard NMS. To do so, each vector is augmented into a circle 39 whose center is at the center of the vector (which is [$x_{center}, y_{center}$]), and the diameter is the length of the vector (l). The intersection-over-union (IoU) score of the circles 39 is then calculated to replace the IoU score used in a standard NMS. In practice, the circumscribed square of said circle 39 is used in place of the circle 39, for faster computation with little quality loss.

FIG. 6 is a table illustrating one exemplary network structure 44 of the DNN 30 of the present disclosure. Feature extraction incorporates a ResNet-like structure. Conv1, 2, . . . , 5 represents convolution blocks. Each row in a convolution block contains the following layers, in sequence: 2D-convolution (Conv2D), batch normalization (BN), and rectified linear unit (ReLU). There are residual layers (i.e. skip connections) between convolution blocks. The feature pyramid 34 (FIG. 5) has 5 levels 36 (FIG. 5), each carrying further extracted feature information at corresponding scales. A pair of classification and regression heads is attached to each level 36 of the feature pyramid 34. Here, k is the number of classes, a is the number of anchor vectors per position, and d is the dimension of the vector regression encoding. Note, the network structure 44 may vary considerably, with this specific network structure 44 being exemplary only.

Figure 8:
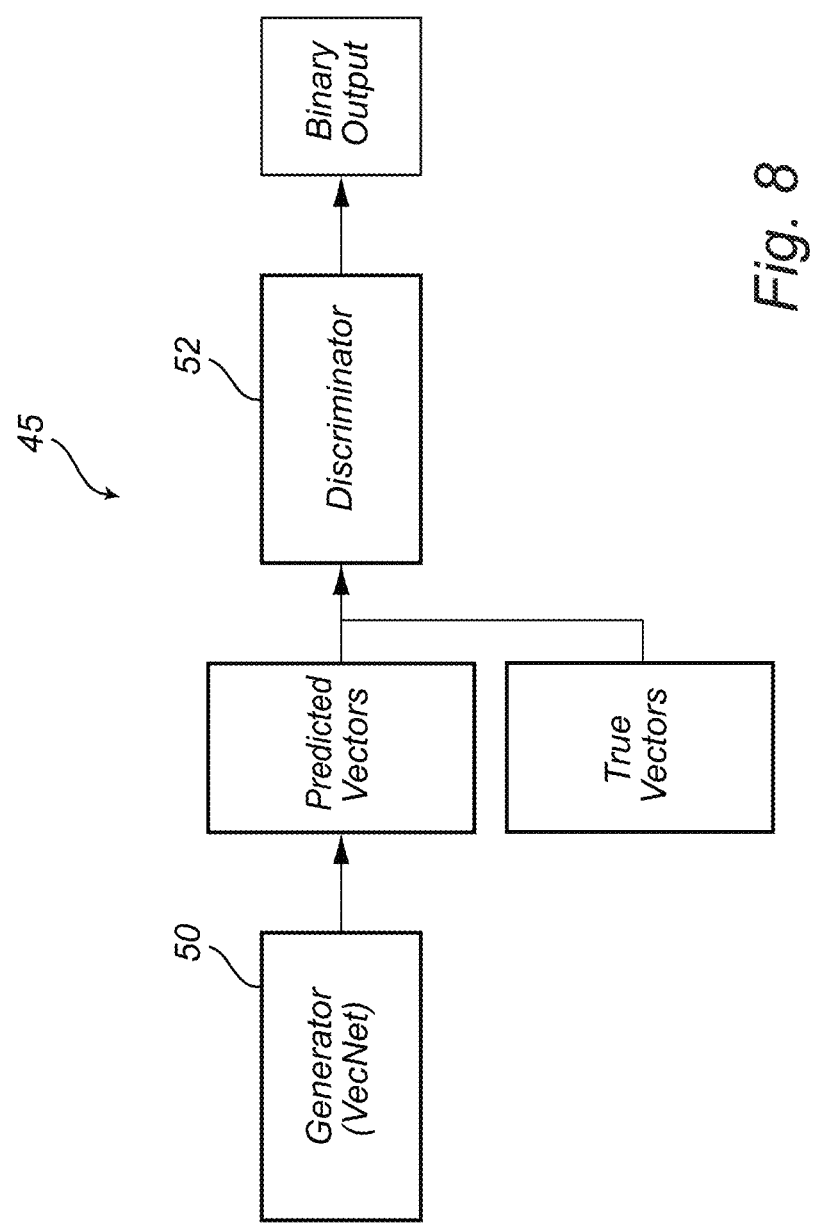
FIG. 8 is a schematic diagram illustrating one exemplary embodiment of the enhanced DNN of the present disclosure.

Referring now specifically to FIG. 7, the base algorithm of the present disclosure is primarily focused on the local correctness of individual vectors 12c. An extended algorithm may be implemented that adds global awareness to the base algorithm, providing globally "smoothed" vectors 12d. This extended algorithm ensures that all generated vectors 12d are globally consistent, just as the underlying parking spaces 14 (FIG. 2) are globally consistent. In other words, the vectors 12d meet at consistent points, with consistent lines and angles, thereby more accurately representing the underlying physical reality. The extended algorithm may utilize a generative approach, for example, the family of variational autoencoders (VAE), or the family of Generative Adversarial Networks (GAN, cGAN, DCGAN, WGAN, etc.), collectively the GAN 45 (FIG. 8). The GAN 45 acts as a global constraint, and different types of GANs 45 may be used to overcome the instability of training.

Referring now specifically to FIG. 8, the GAN 45 is a generative model that can produce realistic samples from random vectors drawn from a known distribution. The GAN 45 consists of a generator 50 and a discriminator 52, both of which are usually implemented as DNNs. The training of the GAN 45 involves an adversarial game between the generator 50 and the discriminator 52. In this context, the generator 50 creates vectors that are intended to come from the same distribution as the vectors in the training data; the discriminator 52 tries to classify between vectors generated by the generator 50 (trying to assign score 0) and real vectors from the training data (trying to assign score 1). Thus, the network 30 (FIG. 5) now act as the generator 50 in the GAN framework. The discriminator 52 learns to distinguish between the vectors predicted by the network 30 and the annotated ground-truth vectors in the training data. By doing so, the GAN framework tries to enforce its generator 50 (i.e. the network 30) to generate vectors as realistic as the true vectors so that discriminator 52 is hard to distinguish. The loss function of the GAN 45 is binary cross entropy, and this loss is added to the original loss of the network 30 for back-propagation during training of the network 30.

As shown in FIG. 7, in the beginning, the discriminator 52 (FIG. 8) will be able to tell that the left vectors are generated because the real vectors usually look like the ones on the right. As the training goes on, the generator 50 (FIG. 8) learns to generate vectors that are more realistic, and they look more and more natural and consistent. During deployment phase, only the generator 50, which is "tuned" by the GAN 45, is deployed. Overall computation is only increased in the training phase, not when the trained model is actually used. Thus, on-board time consumption is not increased by the presence of the GAN 45.

Figure 9:
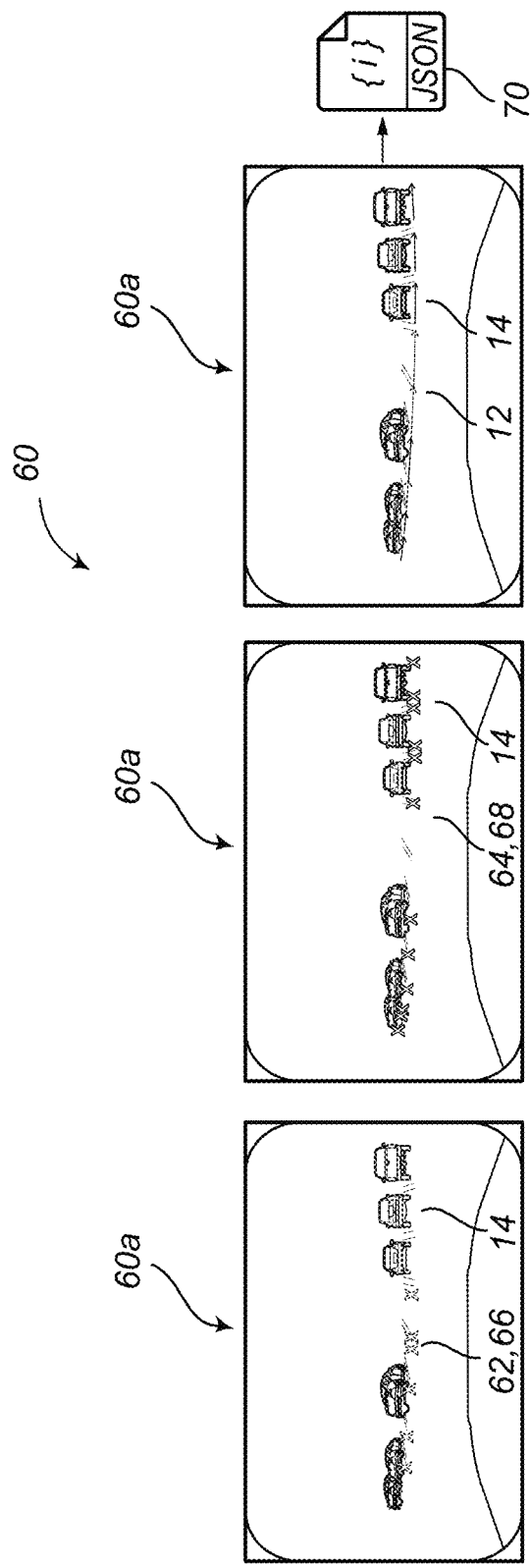
FIG. 9 is a series of front camera images illustrating the use of the annotation tool of the present disclosure.

Referring now specifically to FIG. 9, the network 30 (FIG. 5) is trained using a plurality of annotated training images 60a generated using an annotation tool 60. This annotation tool 60 allows an annotator to select points 62 and 64 on the training images 60a, corresponding to parking space points of interest 66 and 68, segment the training images 60a, annotate the training images 60a, and save the results to a json file 70 or the like. In this specific example, a training image 60a is annotated with two vector classes, although it will be readily apparent to those of ordinary skill in the art that more could be utilized equally. First, entrance points 66 of various parking spaces 14 are selected using a first class of markers 62 indicative of a first parking space characteristic or characteristics (e.g. unoccupied, standard, etc.). Second, entrance points 68 of various parking spaces 14 are selected using a second class of markers 64 indicative of a second parking space characteristic or characteristics (e.g. occupied, handicapped, emergency, etc.). Third, encoded vector representations 12 are generated using the markers 62 and 64 and the training image 60b is saved as the json file 70 or the like for later use.

Figure 10:
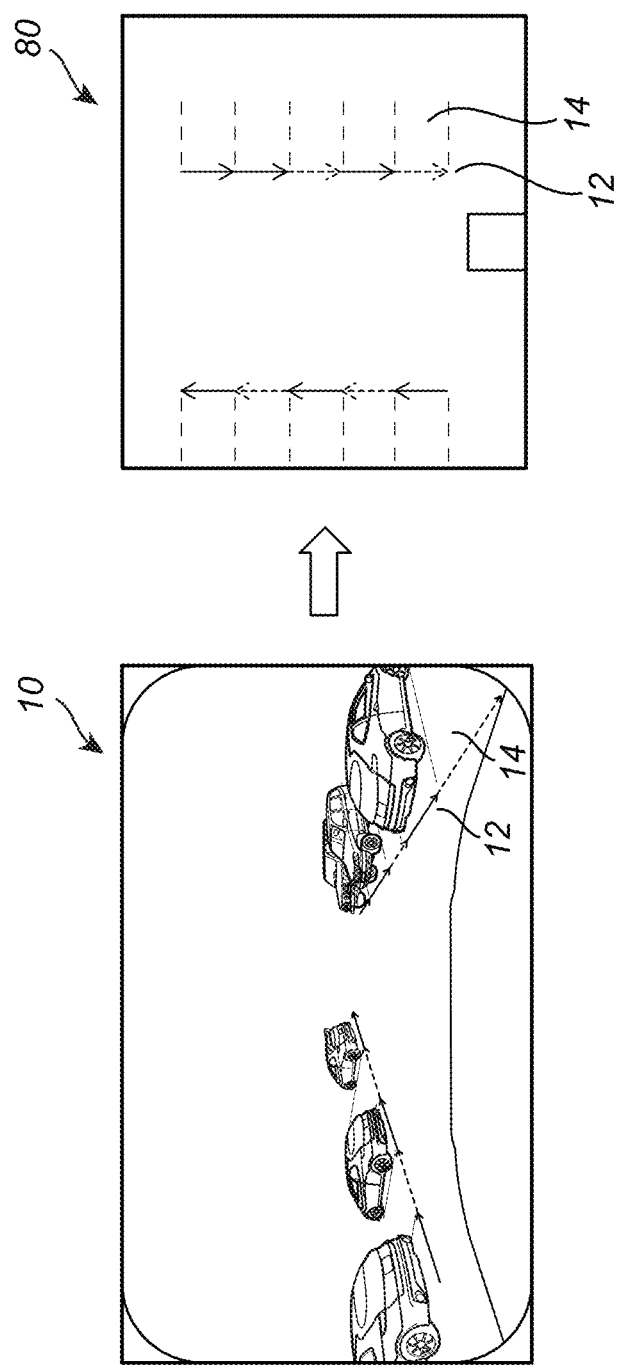
FIG. 10 is a series of images illustrating an overlay of the parking space vector representation of the present disclosure on a BEV image or the like, such that an advantageous driver assistance function may be provided.

Referring now specifically to FIG. 10, as the detected and identified parking spaces 14 are located at readily-ascertainable image coordinates, they can be easily mapped to a BEV 80 or the like, providing ground coordinates, as necessary, for DA or AD applications. These image coordinates can also be overlaid on any variety of camera images to provide an augmented reality tool for assisting a driver in finding vacant parking spaces 14, for example.

By way of another example, the present disclosure utilizes parking space detection methods and systems that detect and pair parking line markers, improving the accuracy and speed of parking space detection in vehicular DA and AD applications. These methods and systems incorporate three major steps: (1) preprocessing—one or more standard camera images are input into the algorithm and a BEV image is output from the algorithm; (2) DNN segmentation of parking line markers—the BEV image is input into the algorithm and a binary image is output from the algorithm (with, e.g., the parking line markers areas displayed in white and the background displayed in black); and (3) binary image processing—the binary image is input into the algorithm and detected and paired parking line markers representing the parking spaces are output from the algorithm.

Figure 11:
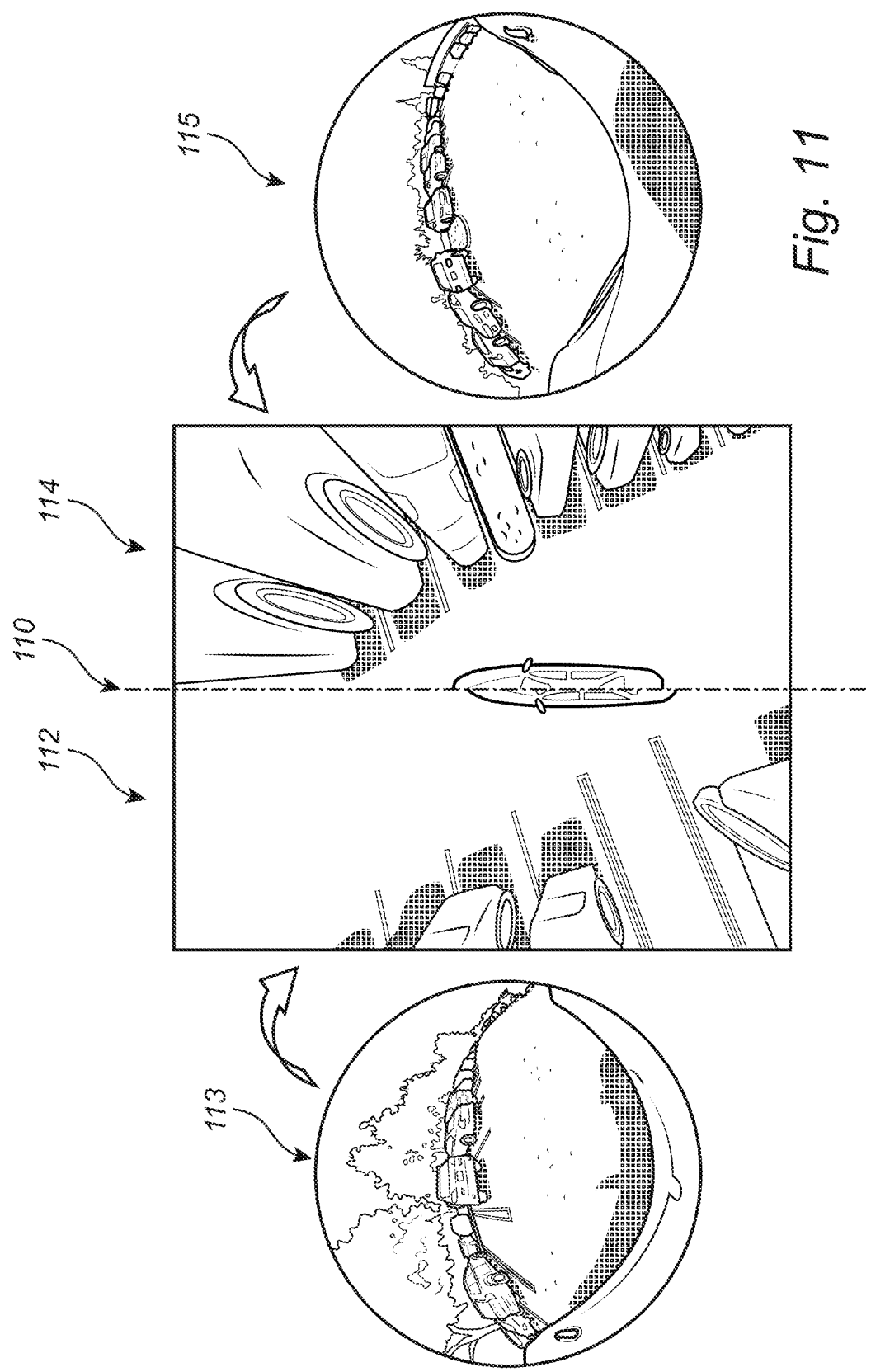
FIG. 11 is a series of camera images illustrating the preprocessing step of the present disclosure—where one or more standard camera images are input into the algorithm and a BEV image is output from the algorithm.
Figure 19:
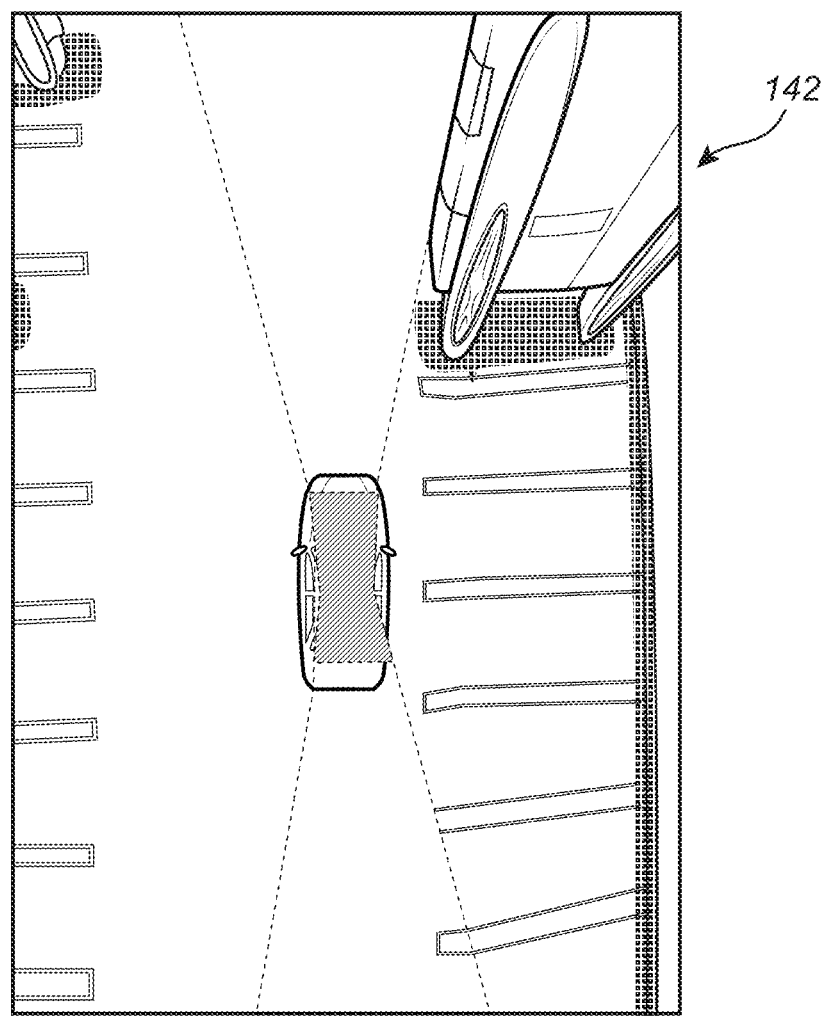
FIG. 19 is an example of a four-camera BEV image that may be used in conjunction with the methods and systems of the present disclosure.

Referring now specifically to FIG. 11, the BEV image is a partial or complete 360-degree "overhead" view of the vehicle and its surroundings generated by transforming and optionally stitching together the standard front, side, and rear camera images obtained using one or more "fisheye" cameras or the like. Such images are very helpful in displaying and assessing the position of the vehicle relative to its surroundings in various applications. In this example, a BEV image 110 including a left-side BEV 112 and a right-side BEV 114 is generated from a left camera image 113 and a right camera image 115. The generation of such BEV images is well known to persons of ordinary skill in the art. Here, in the preprocessing step, the camera(s) utilized are first calibrated to obtain parameters and distortion coefficients. Next, the input camera image(s) 113 and 115 are undistorted using these parameters and distortion coefficients. Next, a homographic matrix is created by mapping coordinates in the image plane(s) of the input camera image(s) 113 and 115 to coordinates in the ground plane of the BEV image 110. Finally, the undistorted input camera image(s) 113 and 115 are transformed to the BEV image 110 using this homographic matrix. Note, a four-camera BEV image 142 is illustrated in FIG. 19 and may be used equally.

Figure 12:
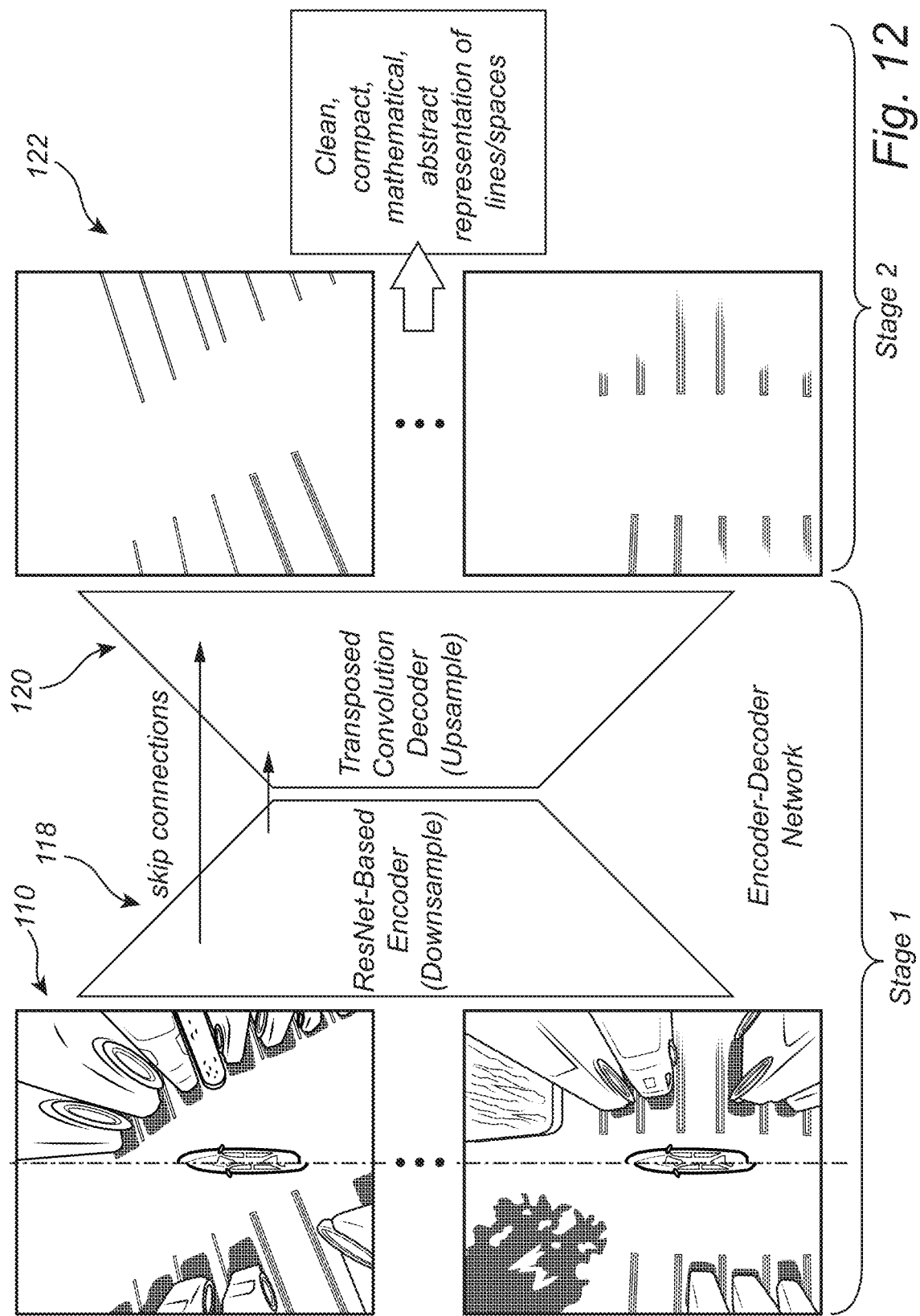
FIG. 12 is a schematic diagram illustrating the DNN segmentation of parking line markers step of the present disclosure—where the BEV image is input into the algorithm and a binary image is output from the algorithm (with, e.g., the parking line markers displayed in white and the background displayed in black)

Referring now specifically to FIG. 12, in the DNN segmentation of parking line markers step, the parking line markers are predicted in the form of binary segments from the input BEV image(s) 110. The DNN used is an image segmentation CNN, consisting of an "encoder" network 118 for feature extraction and a "decoder" network 120 for sampling and generating results from the encoded features. The output of the CNN is one or more binary image(s) 122 (with, e.g., the parking line markers areas displayed in white and the background displayed in black).

The network structure includes Layer 1 . . . Layer N Operations, each having a particular Input Size and a particular Output Size.

Training data must first be prepared, including image annotation and image label creation. In order to formulate this as a segmentation problem, per pixel annotation must be provided. In this case, both the training image labels and predictions are binary images. To reduce the annotation difficulty and improve the annotation speed, the parking line markers are annotated with polylines instead of polygons. Later, a predefined width is assigned to the polylines to further generate binary images as the image labels. In other words, only the center positions of the parking line markers are annotated. This trade-off between the accuracy of the exact line width and annotation efficiency is a design choice that allows rapid annotation, thus enabling large volume of annotations to be obtained.

In the training process, unbalanced classes are handled via Dynamic Weighted Loss, a "Squeeze" Process, etc. Finally, an inference/prediction phase is provided.

Figure 13:
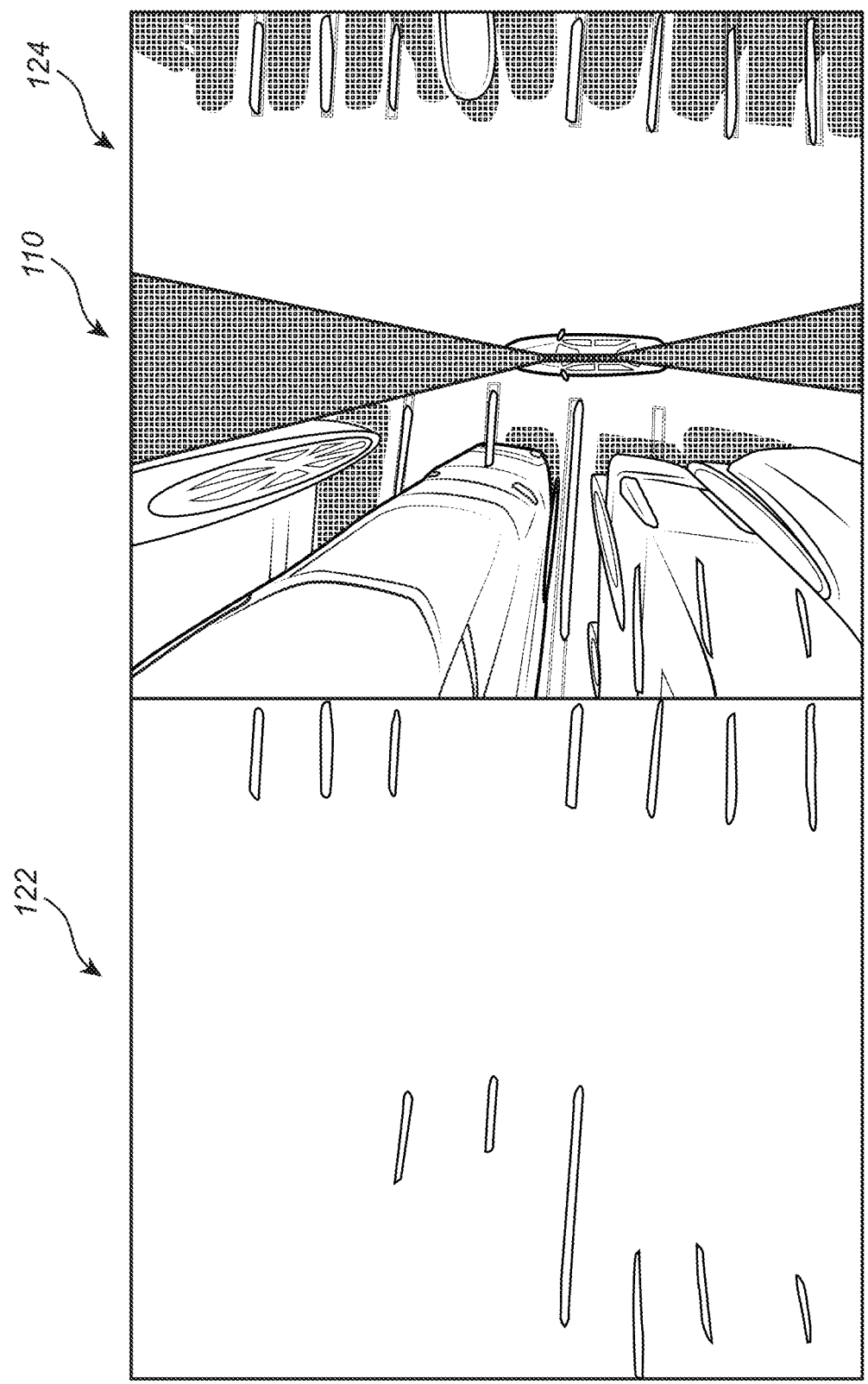
FIG. 13 is a series of camera images illustrating an output binary image of the DNN segmentation step superimposed on an input BEV image of the DNN segmentation step (collectively a combined image), highlight the coincidence or correspondence of the parking line markers and parking spaces.

FIG. 13 illustrates an output binary image 122 superimposed on an input BEV image 110 (collectively a combined image 124), highlight the coincidence of the parking line markers and parking spaces.

Figure 14:
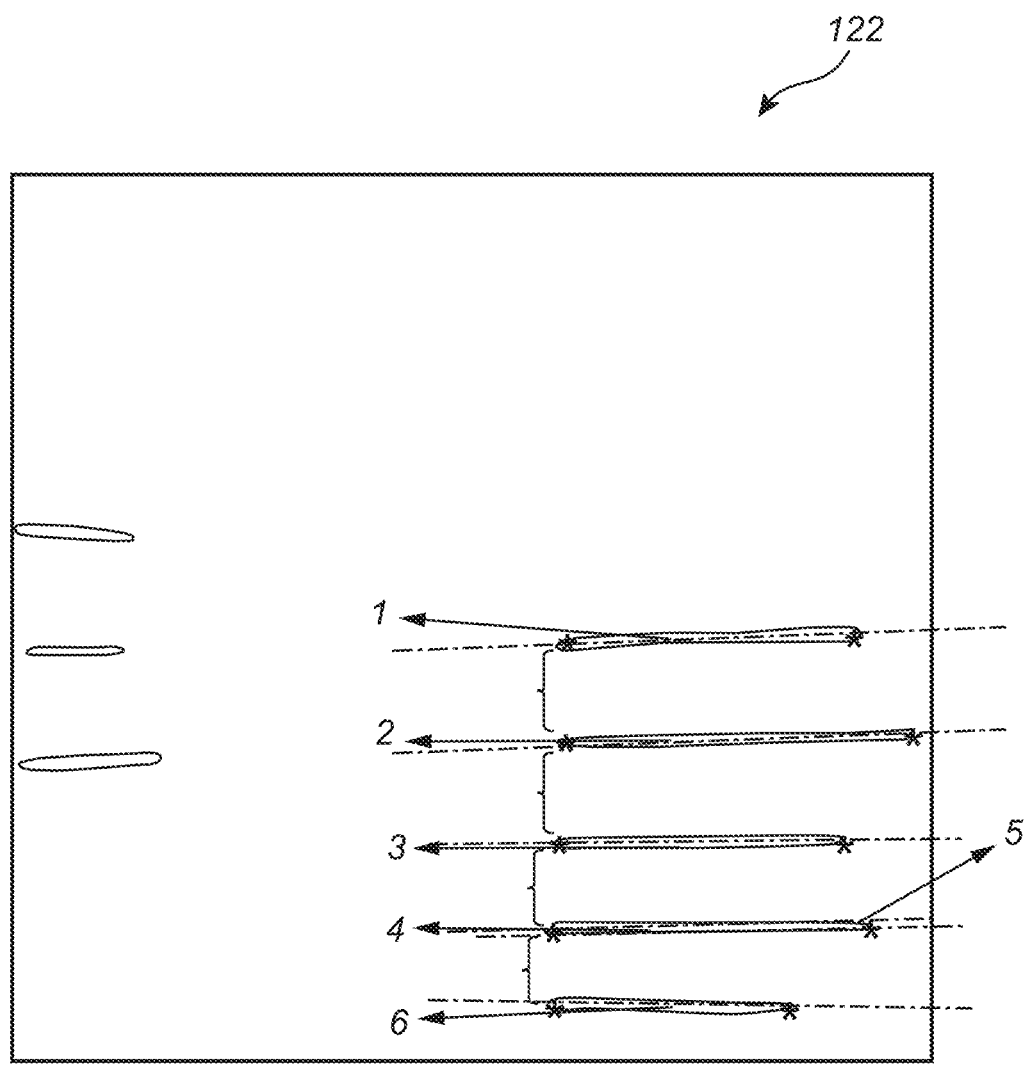
FIG. 14 is a schematic diagram illustrating the binary image processing step of the present disclosure—where the binary image is input into the algorithm and detected and paired parking line markers representing the parking spaces are output from the algorithm.

Referring now specifically to FIG. 14, in the binary image processing step, there are two options: (1) using predicted binary images 122 to mask original images 110 (FIG. 13) and then run the same pipeline on a smaller search space to improve accuracy and speed and (2) find parking line markers directly from the binary images, as in lane marking detection, well known to persons of ordinary skill in the art, by separating different connected pixel groups, performing line fitting in each pixel group, grouping based on similarity, finding endpoints, and ultimately pairing the parking line markers accordingly.

The binary image processing step is conceptually split into two sub-steps: line detection and line pairing.

Related to line detection, pixel "blobs" are first found by searching connected components in a binary image. A two-pass approach with 8 point connectivity is used, for example. In a first scan, a new label is assigned to a current pixel if neighbors of the current pixel are all 0 and increment label=label+1. If there is a non-zero value pixel in the neighbors, a smallest of the neighbor labels is assigned to the current pixel. Meanwhile, the equivalence of the labels is recorded when assigning the smallest label in the neighbors. In a second scan, for every pixel, the smallest label is assigned among the equivalence labels recorded from the first scan. For each pixel "blob" (i.e., connected pixel group), if the pixel "blob" is large enough, then a least squares fitting is performed using the general form of a linear line function: ax+by +c=0. Endpoints of the line segments are then identified. If b=0 or the slope of the line abs(a/b)>1, endpoints are assigned based on y-value first by determining y_min and y_max. If the slope<1, endpoints are assigned based on x-value first by determining x_min and x_max. Line segment length is calculated by checking the distance between the two endpoints. If the line segment length<Threshold1, then the following procedure is skipped and the process continues for the next pixel "blob." If the line segment length>=Threshold1, then the line function parameters a, b, and c, pixel "blob" line segment length, and the corresponding endpoints for the pixel "blob" are recorded. This continues for subsequent pixel "blobs." All line functions are then extracted mathematically from the pixel "blobs," however not all lines are actually individual lines, as some of the lines may belong to same parking line markers. Hence, merging such lines is necessary. One can simply cluster N line functions to obtain individual parking line marker functions, however this may not be a real-time solution considering an unknown number of parking spaces using well known clustering algorithms. Thus, simple matrix-based computation is used, calculating the distance from all endpoints to all lines. Given all N valid pixel "blobs" visited, the distance between every endpoint (2N) of every line to all the lines (N) is calculated using the following formula:

$$d = \frac{|ax_0 + by_0 + c|}{\sqrt{a^2 + b^2}}$$

To reduce overhead, matrix-based computation is utilized by constructing matrices A, B, and C, each an N×N matrix with repeating columns, as original vectors a, b, and c, respectively. The result, d1, is a N×N matrix, in which dij indicates the distance from left endpoint i to line j. Similarly, an N×N matrix d2 indicates the distance from each right endpoint to each line. Via element addition of d1 and d2, one can select a (point, line) pair if 0<distance<Threshold2. Distance 0 is necessarily excluded because the distance is 0 if the point is at its own line.

Given k unique pairs of (endpoints p1, line l2), which indicates that the endpoints p1 of line l1 also likely belong to line l2, one can rewrite such pair as (endpoints p1, endpoints p2) or (line l1, line l2). For every such matching pair (p1, p2), however, if the gap between the two line segments l1 and l2 is too large, or if both line segments are substantially long enough (indicating that these lines actually belong to two different park spaces), such pair needs to be skipped and should not be merged. For all remaining unique pairs (line l1, line l2), they are regrouped as being unconnected. For example, if (line l1, line l2) and (line l2, line l3) exist, they should be regrouped as an extended pair (line l1, line l2, line l3). The line segments are merged in each extended pair by taking the leftmost endpoint and the rightmost endpoint.

Related to line pairing, the two lines of a parking space are detected. Each line in the prior line detection result is iteratively compared with the other lines to find the relevant parking space pair. During each iteration, there are three steps to pair the corresponding parking space lines together. It is assumed that the lines of a parking space are relatively parallel to each other, and that the distance between them is within a given range. Further, each line can only be paired with one or two other lines. The first step is a parallel check, where the slope of the two lines is compared. If the difference between the line slopes is smaller than a threshold, then the second step is performed. The second step is a distance check. The distance between the two lines is calculated to check if the two lines are closely located. Since the two lines are not strictly parallel, the distance is obtained by calculating the distance between the boundary points of one line and the other. The boundary points are provided in the line detection step, and, in most cases, provide the boundaries of a parking space. The distance between the boundary points of the two lines is compared with the diagonal distance of a parking space. This comparison is performed to remove lines located on different sides of the parking space, but which are near one another. The third step is to remove duplication introduced by the threshold utilized. The threshold for the parking space distance is set relatively wider than the actual parking space distance. Thus, some lines may be paired with more than two other lines, which may implicate two parking spaces. In this step, a new parking space candidate is compared with one already obtained for a single checked line. If the new parking space candidate is located in the same direction as the one already obtained and has a smaller distance, then the new parking space candidate is kept as the parking space for the checked line. Thus, at most two parking space candidates are kept for each checked line.

Figure 15:
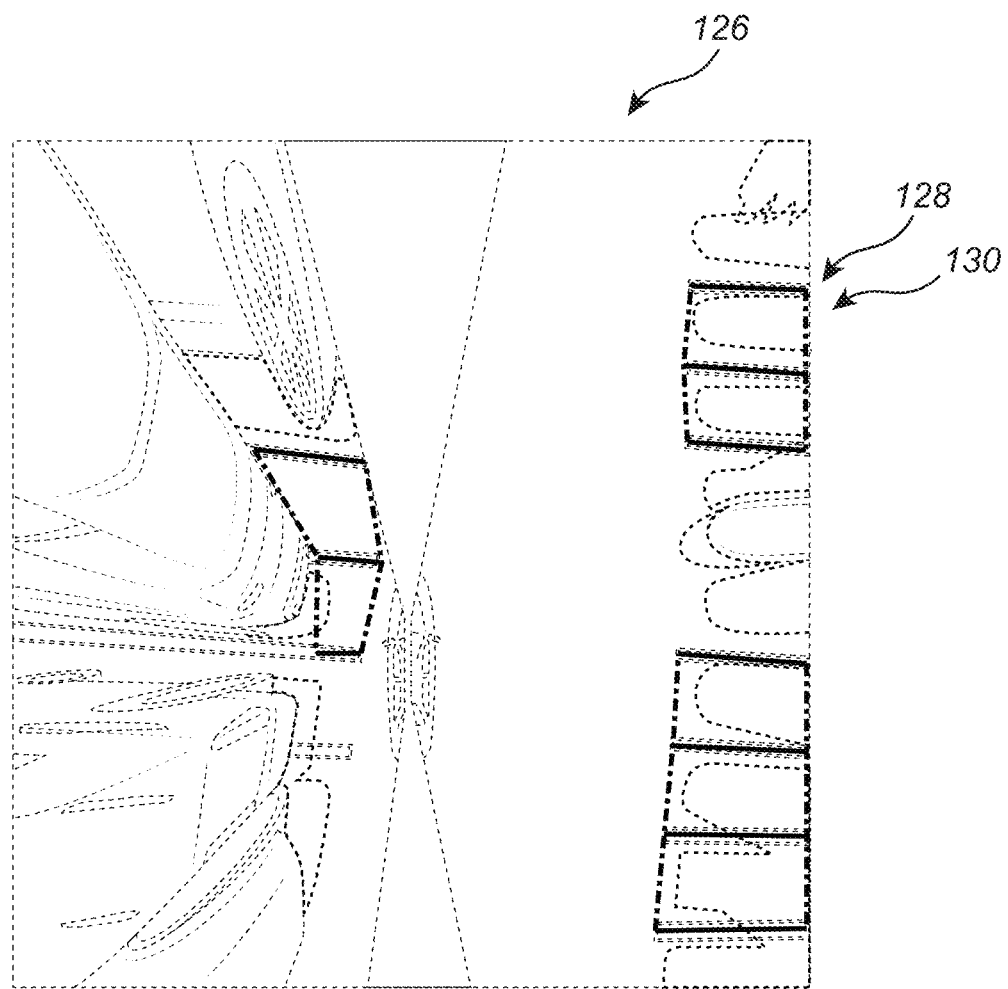
FIG. 15 is a BEV image with the detected parking line markers superimposed and grouped corresponding to the associated parking spaces.

FIG. 15 illustrates a BEV image 126 with the detected parking line markers 128 superimposed and grouped corresponding to the associated parking spaces 130.

Figure 16:
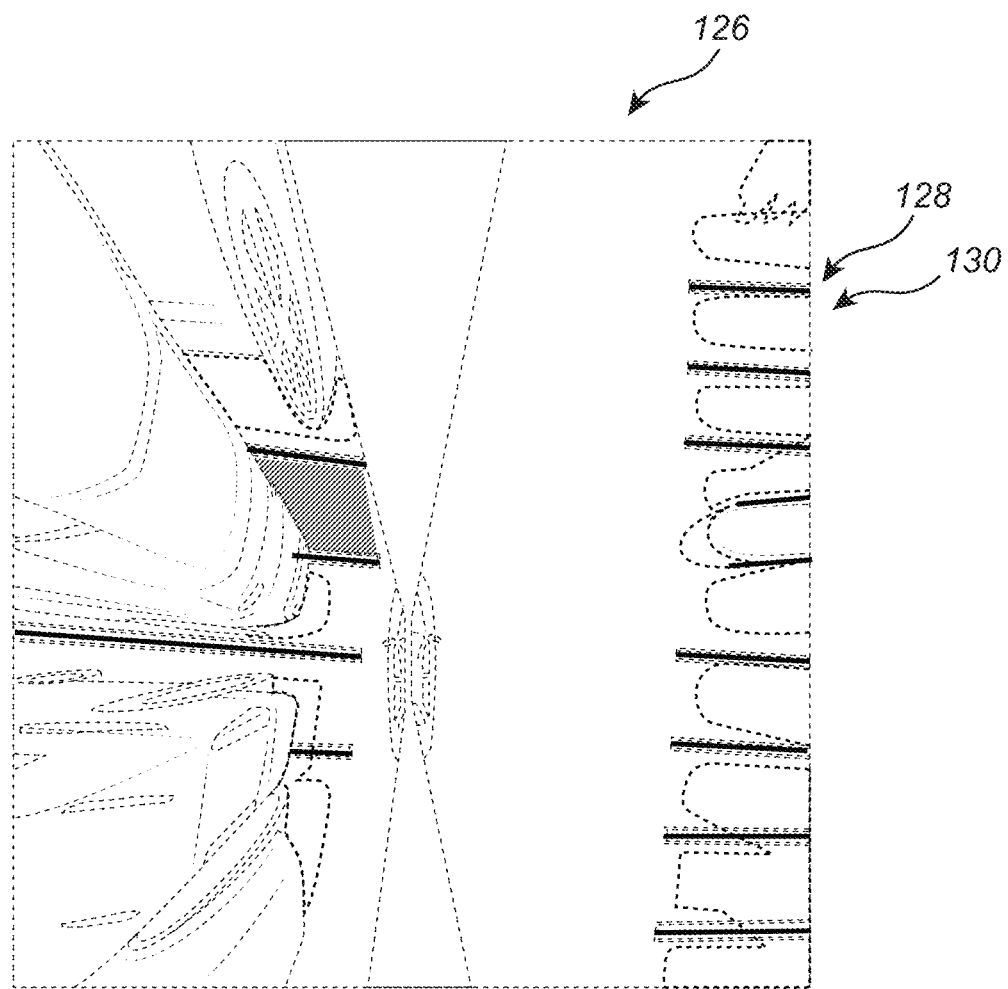
FIG. 16 is another BEV image with the detected parking line markers superimposed, as well as the corresponding parking spaces.

FIG. 16 illustrates another BEV image 126 with the detected parking line markers 128 superimposed, as well as the corresponding parking spaces 130.

Figure 17:
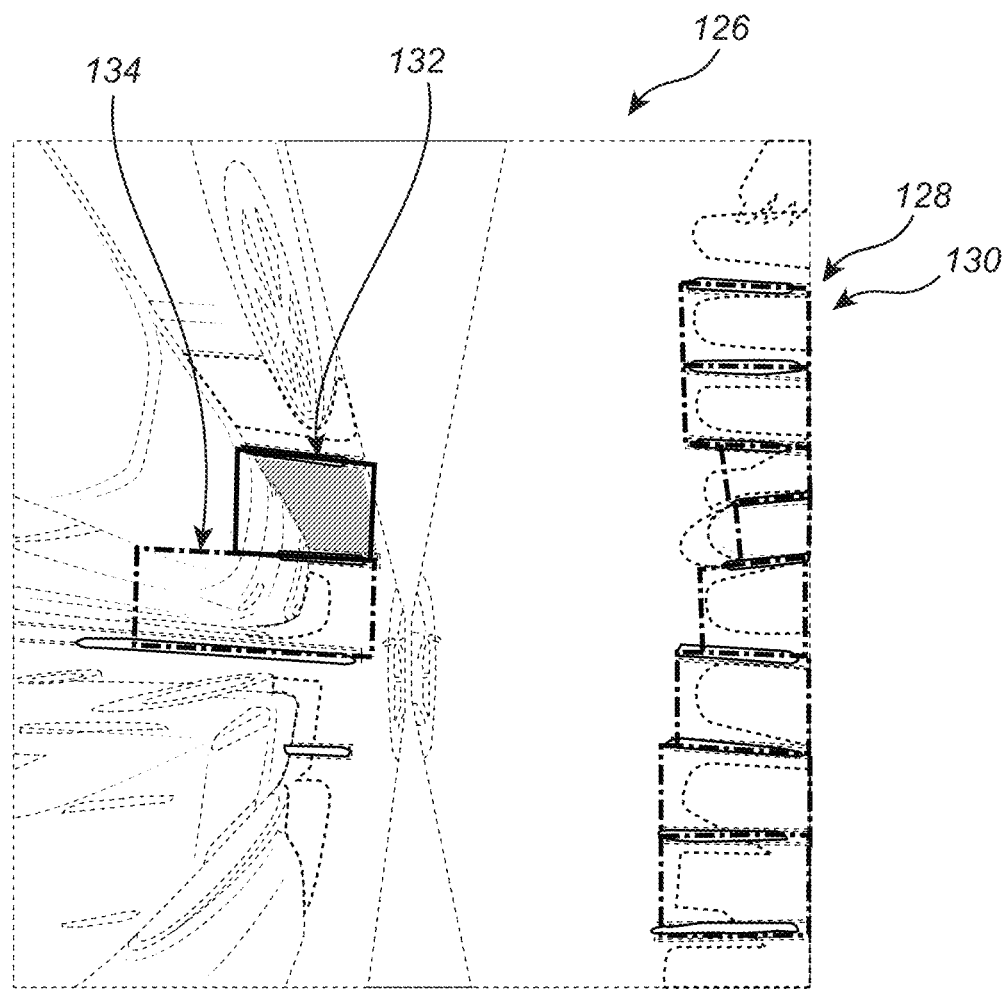
FIG. 17 is a further BEV image with the detected parking line markers superimposed, as well as the corresponding parking spaces, with the parking spaces highlighted by color-coded rectangles, indicating an open parking space and an occupied parking space, respectively.

FIG. 17 illustrates a further BEV image 126 with the detected parking line markers 128 superimposed, as well as the corresponding parking spaces 130, with the parking spaces highlighted by color-coded rectangles 132 and 134, indicating an open parking space 132 and an occupied parking space 134, respectively.

Figure 18:
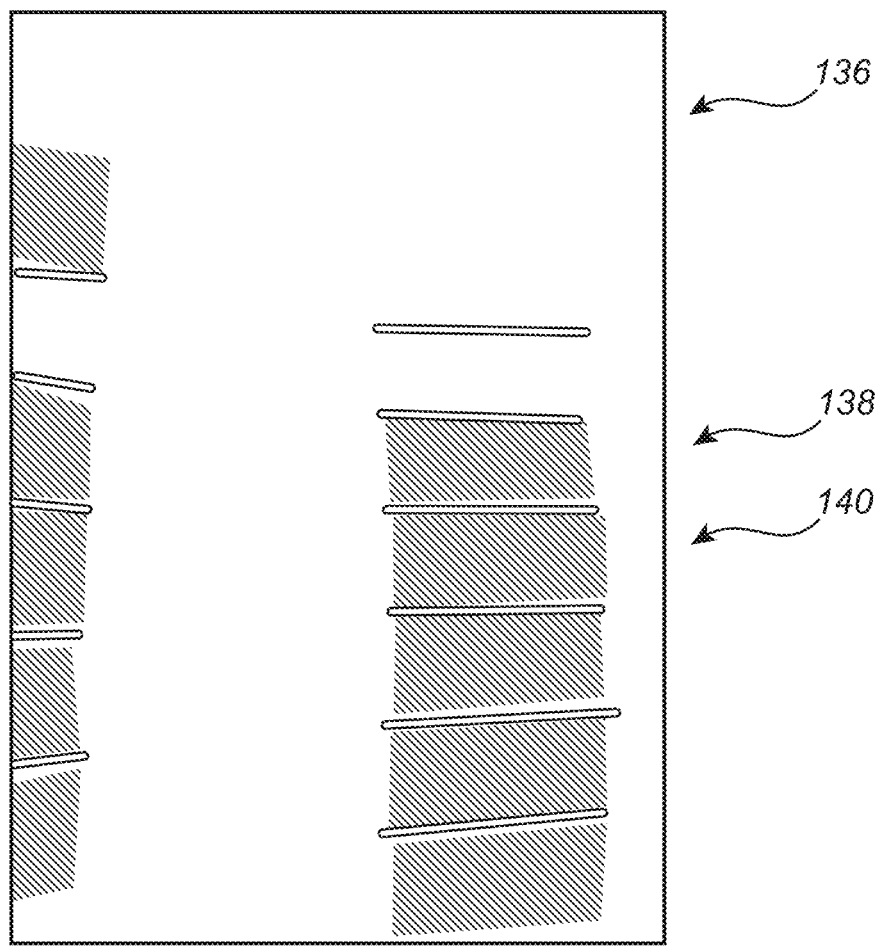
FIG. 18 is a binary image illustrating a multi-class application of the present disclosure.

The system of the present disclosure not only detects and pairs parking line markers, but also detects and classifies the spaces between the lines, i.e. parking spaces/spots, as illustrated in FIG. 16. This enables the "rectangle representation" of FIG. 17. This can be extended to more classes/types. Referring now specifically to FIG. 18, the process of detecting parking spaces is essentially the same as for detecting parking line markers, but instead of segmenting the images into 2 (or binary) classes (lines and background), one now segments the images into 3 (or multiple) classes (background 136, parking spaces/spots 138, and lines 140).

Thus, again, the present disclosure provides parking space detection methods and systems that detect and pair parking line markers, improving the accuracy and speed of parking space detection in vehicular DA and AD applications. These methods and systems incorporate three major steps: (1) preprocessing—one or more standard camera images are input into the algorithm and a BEV image is output from the algorithm; (2) DNN segmentation of parking line markers—the BEV image is input into the algorithm and a binary image is output from the algorithm (with, e.g., the parking line markers areas displayed in white and the background displayed in black); and (3) binary image processing—the binary image is input into the algorithm and detected and paired parking line markers representing the parking spaces are output from the algorithm.

Further, the methods and systems of the present disclosure can be used to detect a vacant parking space from parking line markers that are paired, as described above. The methods and systems can also be used to detect parking spaces in a rectangle representation mode, this can be done either by deriving the rectangles from the detected parking line markers and spaces or by directly inferencing the rectangles using a trained DNN. The methods and systems can further be used to detect the entrances of detected parking spaces.

Figure 20:
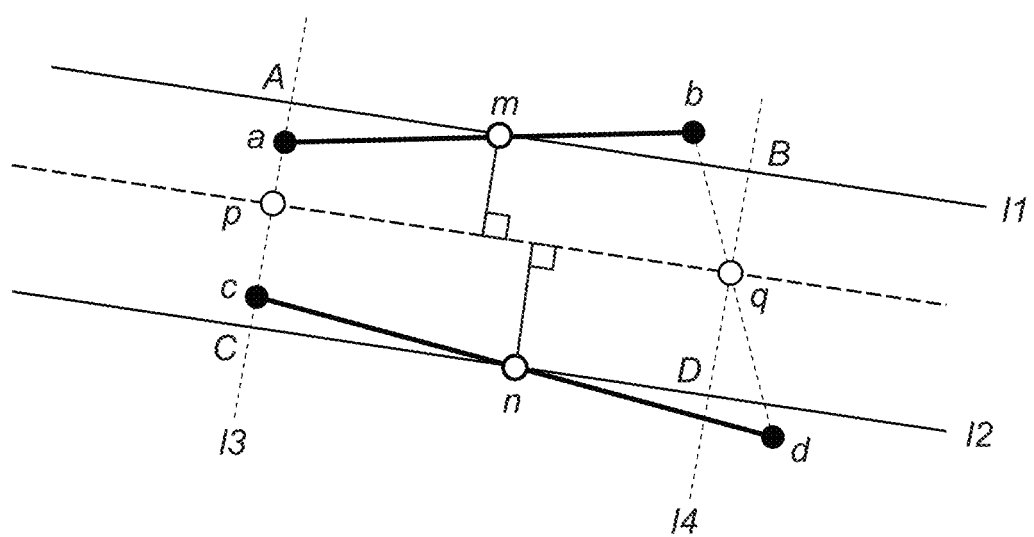
FIG. 20 is a schematic diagram illustrating a paired parking line markers-to-rectangles algorithm of the present disclosure.

Referring to FIG. 20, in the paired parking line markers-to-rectangles case, when two parking line markers are detected and paired, the space between the paired parking lanes/lines is essentially the parking space (whether empty or occupied). However, the enclosed space between the two parking line markers could be any convex quadrilateral shape, which leads to difficulty for parameter encoding, and thereafter for evaluation purposes. Thus, a rectangular representation based on paired parking line markers is used.

Given that line ab and line cd are the two detected parking line makers (they may not be perfectly parallel), this forms the convex quadrilateral abcd. The middle points of each edge of quadrilateral abcd are computed, which are m, n, p, and q respectively. Hence, the major axis of the targeted rectangle is pq, which connects the middle points of the end and entrance of the park space. Thus, the edges of the target rectangle are the ones parallel to the major axis pq and passing point m and n, which are l1 and l2. The other two edges of the target rectangle are defined by having perpendicular lines to major axis pq meanwhile passing points p and q. With these steps, rectangle ABCD is obtained, and that is the one that must be encoded to represent the detected parking space.

One should note that the encoding here is a rectangular, rather than a parallelogram (especially for angled parking). Rectangular representation is preferred and adopted because the actual occupied parking space by a vehicle is a rectangle and it needs fewer parameters to encode than a parallelogram, hence this provides ease for later evaluation.

Parking occupancy detection is essentially dependent on pixel percentage of detected empty parking space inside the rectangle representing the parking space. The empty parking space, which can be arbitrarily shaped, is the raw binary output from a deep learning semantic segmentation algorithm, while the rectangular representation is formed following the procedure above. In the case where the empty parking space pixel percentage inside the rectangle is larger than a predetermined threshold, an empty parking space is determined. An example is illustrated in FIG. 21, where rectangles are drawn to represent the parking spaces, while a given color or coding indicates that a specific parking space is not occupied, while another given color or coding indicates that a specific parking space is occupied.

Alternatively, a DNN is trained with parking spaces annotated by rectangles to directly detect a parking space in a rectangle representation. The input of the network is the BEV image, while the output of the network is rectangles representing the parking spaces. The rectangles have class/type information for different types of parking spaces. The present disclosure is also capable of detecting the entrances of the parking spaces.

Figure 22:
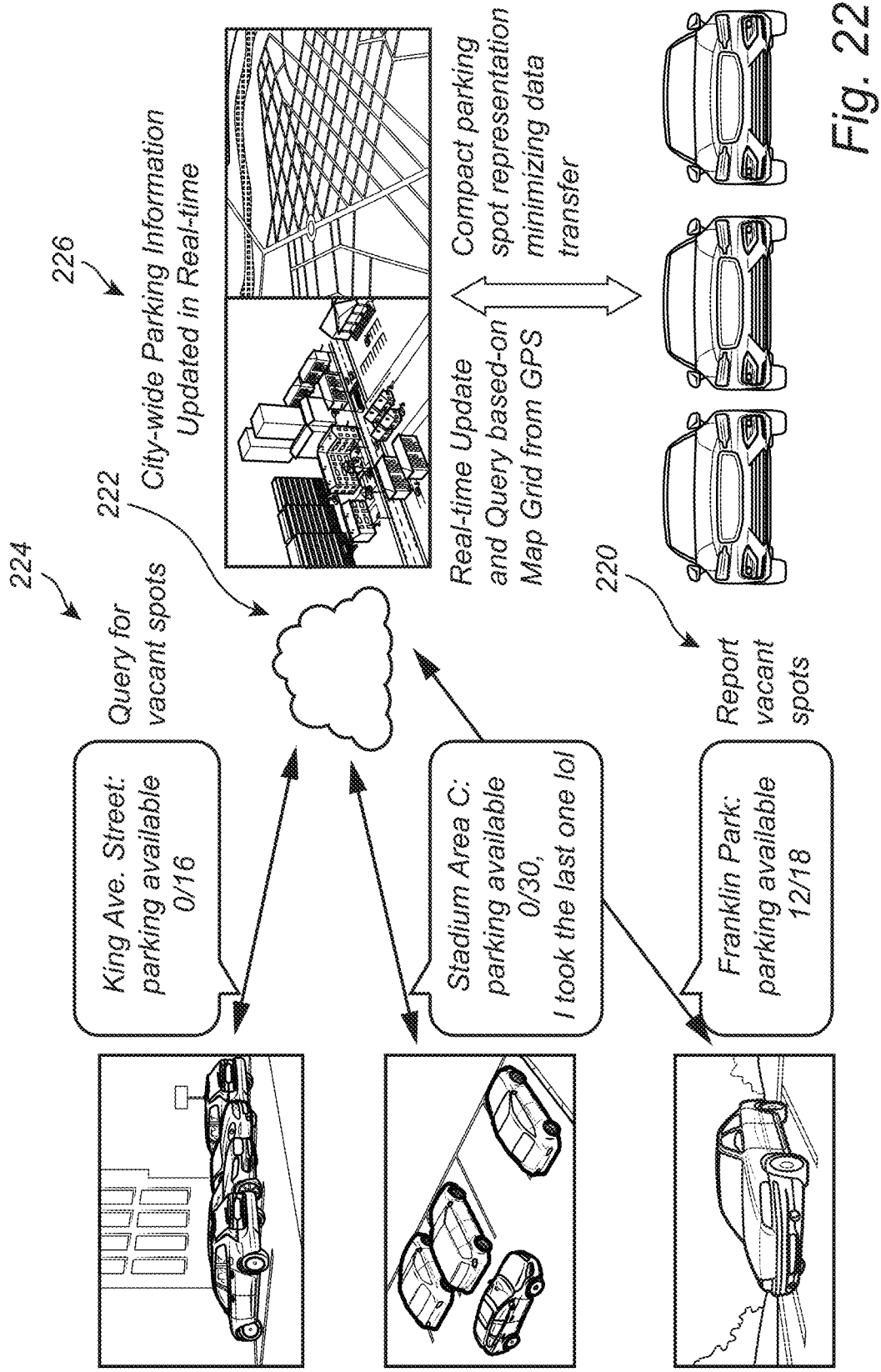
FIG. 22 is a schematic diagram illustrating one exemplary embodiment of the PAM system and method of the present disclosure.

Referring now specifically to FIG. 22, in one exemplary embodiment, a vehicle scans for open and occupied parking spaces 220 using the above methodologies and, optionally, classifies the parking spaces. This parking space information is communicated to the cloud 222 in real time or periodically on a predetermined basis. Vehicles, mobile applications, and the like may then query the cloud-based system 224 to retrieve the parking space information for a given area of interest. If real-time parking space information is not available for the area of interest, historical and/or statistical parking availability information may be provided. Thus information may be provided using one or more of a BEV-map overlay view, a 3-D driving perspective view, and/or turn-by-turn driving directions, all of which help guide a driver or an AD vehicle to an open parking space or area that is likely to have an open parking space. Further, other parking space information may also be made available, such as parking hours, parking fees, rules and regulations, etc., all of which can be pulled from publicly-available map data, infrastructural or intracompany cooperation, and/or sensed using an appropriate AI technology.

On the cloud side, area-wide parking space information is received from multiple vehicles and updated 226, preferably in real time. Global positioning system (GPS) data associated with the various vehicle updates are correlated to one or more area maps, parking lot layouts, etc. Parking space information is then sent to requesting vehicle in a compact data format to minimize download times.

Figure 23:
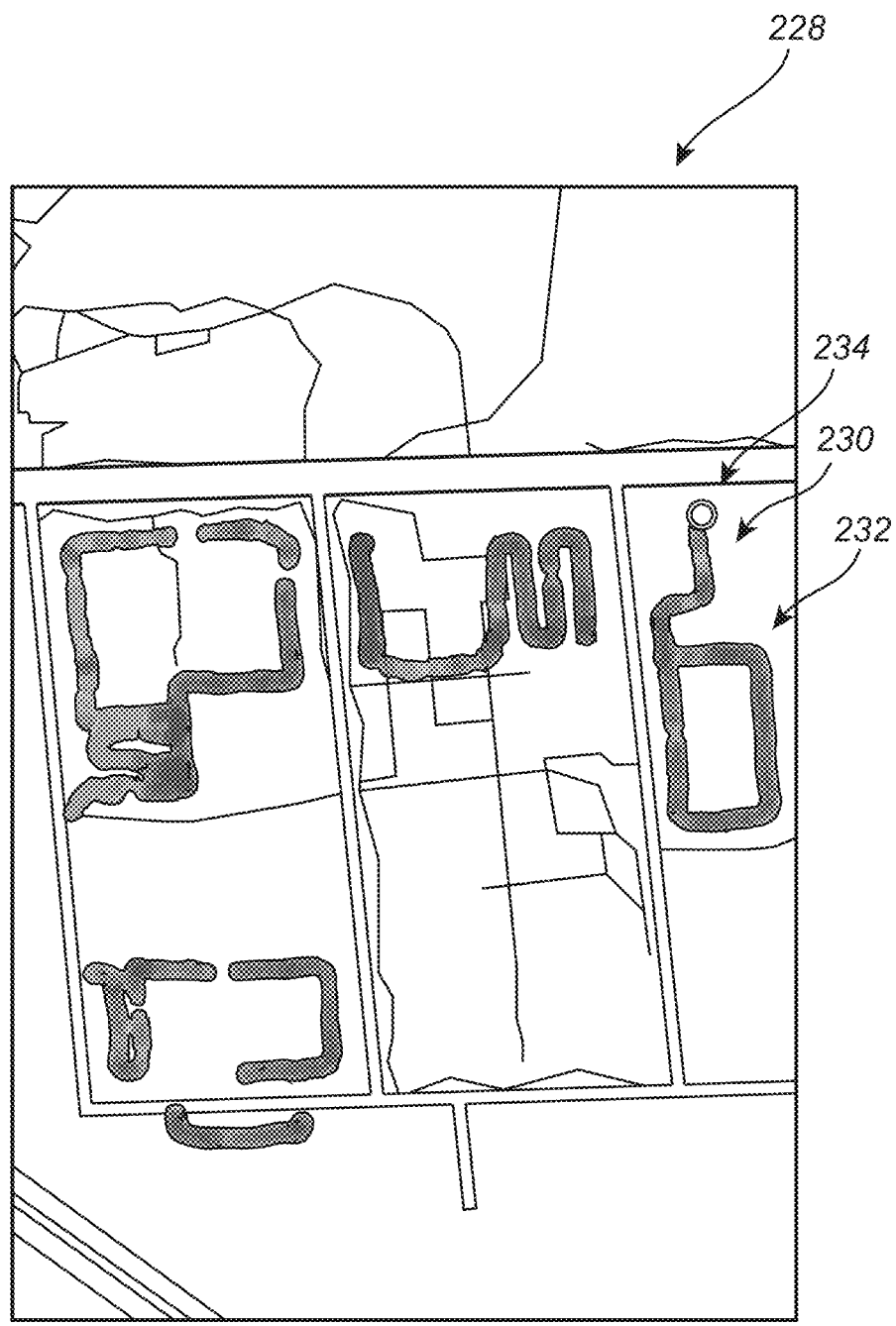
FIG. 23 is a mobile application display illustrating a vehicle generating a heat map of a parking area utilizing one exemplary embodiment of the PAM system and method of the present disclosure.

FIG. 23 is a mobile application display illustrating a vehicle generating a heat map of a parking area 228 utilizing one exemplary embodiment of the PAM system and method of the present disclosure. Here, open parking spaces may be displayed in a first color 230, occupied parking space may be displayed in a second color 232, and handicap parking spaces or the like may be displayed in a third color 234.

By way of one exemplary embodiment, the percentage of empty parking spaces within each frame (e.g., 21×14m) can be calculated, with the parking availability then ranging from 0 to 1, which can be translated into a color-coded representation for each area. The updating frequency of the PAM system can be static or dynamic, i.e., based on GPS movement, detection updates, etc. When many vehicles are driving around an area and providing updates, updated parking space information should be available. Otherwise, historical data may be provided in response to a query. For example, the average parking availability for a given area can be provided for a like month, week, day, hour, holiday, etc. Preferably, the user can toggle between real-time, historical, and predicted data, with associated aggregated statistics. Past data can be used to predict future data, optionally using a ML algorithm.

It is to be recognized that, depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) a tangible computer-readable storage medium that is non-transitory or (2) a communication medium, such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include random-access memory (RAM), read-only memory (ROM), electrically erasable-programmable read-only memory (EEPROM), compact disc read-only memory (CD-ROM) or other optical disc storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared (IR), radio frequency (RF), and microwave, then the coaxial cable, fiber optic cable, twisted pair, DSL, or wireless technologies, such as IR, RF, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), complex programmable logic devices (CPLDs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

The present disclosure provides vehicle parking availability map systems and methods that utilize real-time and historical vehicle camera data to identify, predict, and locate open parking spaces for a user via an in-vehicle display, a mobile application, a web-based application, or the like. The on-board camera(s) in a vehicle is/are used to detect and classify open and occupied parking spaces. This parking space information is then uploaded to the cloud, aggregated, and leveraged, providing real-time and historical data that can be used by numerous users to find available parking in numerous areas or lots.

The PAM provided can display open parking spaces on a map of an area or lot, or a heat map of collections of such open parking spaces, as well as a percentage of open parking spaces or parking density for an area or lot. This information can be real-time, historical, or predicted given the location, date, and time. The display utilized can incorporate a BEV or a 3-D perspective view, and can provide turn-by-turn driving directions (visual and/or audible) to an open parking space or collection of such open parking spaces. Further, particular open parking spaces of interest can be identified and located, such as handicap parking spaces, etc.

Again, the concepts of the present disclosure are not limited to camera sensors, but may extend to other perception sensors as well, such as near-field sensors, LIDAR sensors, and the like. Thus, as used herein, "camera" is intended to contemplate such other sensor types as well, whether front-facing, side-facing, or rear-facing relative to the exterior of the vehicle.

Although the present disclosure is illustrated and described herein with reference to preferred embodiments and specific examples thereof, it will be readily apparent to persons of ordinary skill in the art that other embodiments and examples may perform similar functions and/or achieve like results. All such equivalent embodiments and examples are within the spirit and scope of the present invention, are contemplated thereby, and are intended to be covered by the following non-limiting claims for all purposes.

What is claimed is:

1. A parking availability map system, comprising:
a sensor-based parking space detection system coupled to a vehicle and operable for detecting and identifying a plurality of open and occupied parking spaces within a predetermined vicinity of the vehicle and storing this information as open and occupied parking space data, wherein the sensor-based parking space detection system detects and identifies the plurality of open and occupied parking spaces by segmenting the plurality of open and occupied parking spaces from one or more images obtained by the vehicle and overlaying the plurality of open and occupied parking spaces with vector representations encoded with parking space characteristics; and
a parking space data system operable for receiving the open and occupied parking space data from the sensor-based parking space detection system and receiving a parking space availability query from a user disposed remotely from the parking space data system, and, responsive to the parking space availability query, transmitting parking space availability information to the user.

2. The parking availability map system of claim 1, wherein the sensor-based parking space detection system comprises a camera-based parking space detection system.

3. The parking availability map system of claim 1, wherein the detecting and identifying the plurality of open and occupied parking spaces comprises, for each parking space, classifying a type of parking space.

4. The parking availability map system of claim 1, wherein the receiving the open and occupied parking space data comprises, for each parking space, receiving location information based on a location of the vehicle.

5. The parking availability map system of claim 1, wherein the parking space availability information comprises one or more of real-time parking space availability information, historical parking space availability information, and statistical parking space availability information.

6. The parking availability map system of claim 1, wherein the parking space availability information comprises one or more of a heat map indicating locations of open parking spaces, a bird's-eye-view map indicating locations of open parking spaces, a three-dimensional map indicating locations of open parking spaces, and turn-by-turn directions to a location of an open parking space.

7. The parking availability map system of claim 1, wherein receiving the parking space availability query from the user comprises receiving the parking space availability query from one of an on-board vehicle application, a mobile application, a web-based application, and an autonomous driving system.

8. A parking availability map method, comprising:
using a sensor-based parking space detection system coupled to a vehicle, detecting and identifying a plurality of open and occupied parking spaces within a predetermined vicinity of the vehicle and storing this information as open and occupied parking space data, wherein the sensor-based parking space detection system detects and identifies the plurality of open and occupied parking spaces by segmenting the plurality of open and occupied parking spaces from one or more images obtained by the vehicle and overlaying the plurality of open and occupied parking spaces with vector representations encoded with parking space characteristics; and
using a parking space data system, receiving the open and occupied parking space data from the sensor-based parking space detection system and receiving a parking space availability query from a user disposed remotely from the parking space data system, and, responsive to the parking space availability query, transmitting parking space availability information to the user.

9. The parking availability map method of claim 8, wherein the sensor-based parking space detection system comprises a camera-based parking space detection system.

10. The parking availability map method of claim 8, wherein the detecting and identifying the plurality of open and occupied parking spaces comprises, for each parking space, classifying a type of parking space.

11. The parking availability map method of claim 8, wherein the receiving the open and occupied parking space data comprises, for each parking space, receiving location information based on a location of the vehicle.

12. The parking availability map method of claim 8, wherein the parking space availability information comprises one or more of real-time parking space availability information, historical parking space availability information, and statistical parking space availability information.

13. The parking availability map method of claim 8, wherein the parking space availability information comprises one or more of a heat map indicating locations of open parking spaces, a bird's-eye-view map indicating locations of open parking spaces, a three-dimensional map indicating locations of open parking spaces, and turn-by-turn directions to a location of an open parking space.

14. The parking availability map method of claim 8, wherein receiving the parking space availability query from the user comprises receiving the parking space availability query from one of an on-board vehicle application, a mobile application, a web-based application, and an autonomous driving system.

15. A non-transitory computer-readable medium stored in a memory and executed by a processor to perform the steps comprising one or more of:
receiving open and occupied parking space data from a sensor-based parking space detection system, wherein the sensor-based parking space detection system is coupled to a vehicle and operable for detecting and identifying a plurality of open and occupied parking spaces within a predetermined vicinity of the vehicle and storing this information as the open and occupied parking space data, wherein the sensor-based parking space detection system detects and identifies the plurality of open and occupied parking spaces by segmenting the plurality of open and occupied parking spaces from one or more images obtained by the vehicle and overlaying the plurality of open and occupied parking spaces with vector representations encoded with parking space characteristics; and
receiving a parking space availability query from a remote user, and, responsive to the parking space availability query, transmitting parking space availability information to the user.

16. The non-transitory computer-readable medium of claim 15, wherein the detecting and identifying the plurality of open and occupied parking spaces comprises, for each parking space, classifying a type of parking space.

17. The non-transitory computer-readable medium of claim 15, wherein the receiving the open and occupied parking space data comprises, for each parking space, receiving location information based on a location of the vehicle.

18. The non-transitory computer-readable medium of claim 15, wherein the parking space availability information comprises one or more of real-time parking space availability information, historical parking space availability information, and statistical parking space availability information.

19. The non-transitory computer-readable medium of claim 15, wherein the parking space availability information comprises one or more of a heat map indicating locations of open parking spaces, a bird's-eye-view map indicating locations of open parking spaces, a three-dimensional map indicating locations of open parking spaces, and turn-by-turn directions to a location of an open parking space.

20. The non-transitory computer-readable medium of claim 15, wherein receiving the parking space availability query from the user comprises receiving the parking space availability query from one of an on-board vehicle application, a mobile application, a web-based application, and an autonomous driving system.

\* \* \* \* \*